US012654260B2

(12) United States Patent
Funami et al.

(10) Patent No.: US 12,654,260 B2
(45) Date of Patent: Jun. 16, 2026

(54) LASER PROCESSING METHOD AND LASER PROCESSING DEVICE

(71) Applicant: Panasonic Intellectual Property Management Co., Ltd., Osaka (JP)

(72) Inventors: Koji Funami, Kyoto (JP); Kazuki Fujiwara, Osaka (JP); Izuru Nakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1002 days.

(21) Appl. No.: 17/664,065

(22) Filed: May 19, 2022

(65) Prior Publication Data

US 2022/0388098 A1 Dec. 8, 2022

(30) Foreign Application Priority Data

Jun. 7, 2021 (JP) ................................. 2021-095430

(51) Int. Cl.
*B23K 26/70* (2014.01)
*B23K 26/064* (2014.01)
*B23K 26/21* (2014.01)

(52) U.S. Cl.
CPC ........ *B23K 26/707* (2015.10); *B23K 26/0643* (2013.01); *B23K 26/21* (2015.10)

(58) Field of Classification Search
CPC .... B23K 31/125; B23K 31/00; B23K 26/032; B23K 26/00; B23K 9/1274;
(Continued)

(56) References Cited

U.S. PATENT DOCUMENTS

2012/0125899 A1* 5/2012 Oh ...................... B23K 26/032
219/121.64
2013/0062324 A1* 3/2013 Dorsch .................. B23K 26/20
219/121.63
(Continued)

FOREIGN PATENT DOCUMENTS

JP 11-138278 5/1999
JP H11138278 A * 5/1999 ........... B23K 26/064
(Continued)

OTHER PUBLICATIONS

English Translation of Search Report dated Mar. 24, 2026 in Chinese Patent Application No. 202210611098.9.

*Primary Examiner* — Steven W Crabb
*Assistant Examiner* — Ket D Dang
(74) *Attorney, Agent, or Firm* — Wenderoth, Lind & Ponack, L.L.P.

(57) ABSTRACT

A laser processing method is for scanning over a first member in a first affection while irradiating the first member with a laser beam emitted from an oscillator, and joining the first member and a second member adjacent to the first member by a molten portion. The laser processing method includes: in each of a first measurement region and a second measurement region different from the first measurement region, measuring an intensity of a welding light including a heat radiation light radiated from the first member or the second member by irradiation with the laser beam, a plasma light, or a reflected light; and evaluating a processing state based on the intensity of the welding light measured in each of the first measurement region and the second measurement region, the first measurement region and the second measurement region being aligned in a second direction intersecting the first direction.

10 Claims, 17 Drawing Sheets

(58) Field of Classification Search
CPC .. B23K 26/0643; B23K 26/082; B23K 26/21;
B23K 26/707; G06T 2207/30164; G06T
7/136; G01N 21/55; B29C 65/1616
USPC ..................................................... 219/121.61
See application file for complete search history.

(56) References Cited

U.S. PATENT DOCUMENTS

| | | | | |
|---|---|---|---|---|
| 2016/0136756 A1* | 5/2016 | Ogura | .................... | B23K 26/21 |
| | | | | 219/121.64 |
| 2016/0356595 A1* | 12/2016 | Lessmueller | ........ | B23K 26/044 |
| 2018/0099356 A1 | 4/2018 | Miyagi | | |
| 2019/0240785 A1* | 8/2019 | Magg | ................. | B23K 26/0626 |
| 2019/0321905 A1* | 10/2019 | Wang | .................... | B23K 9/167 |
| 2020/0016691 A1 | 1/2020 | Tanaka et al. | | |
| 2022/0331911 A1* | 10/2022 | Boco | .................... | B23K 26/707 |
| 2023/0073549 A1* | 3/2023 | Reiser | ................. | B23K 26/032 |

FOREIGN PATENT DOCUMENTS

| | | |
|---|---|---|
| JP | 2000-042769 | 2/2000 |
| JP | 3184969 B | 7/2001 |
| WO | 2016/181695 | 11/2016 |
| WO | 2018/185973 | 10/2018 |

* cited by examiner (i)

(ii)

(i)

(ii)

LASER PROCESSING METHOD AND LASER PROCESSING DEVICE

BACKGROUND

1. Technical Field

The present disclosure relates to a laser processing method and a laser processing device.

2. Description of the Related Art

Conventionally, known as a laser processing method is a method of performing laser welding and evaluating a welding state in real time. A welding state is evaluated based on a peak intensity of a welding light such as a heat radiation light emitted from a molten portion during laser welding, a plasma light, or a laser reflected light, or on an integral value of a welding light intensity corresponding to light emission energy.

For example, in WO 2018/185973, a welding light measurement optical system attached to a laser processing head is used to monitor laser processing from a welding light emitted from a molten portion during laser welding.

Further, for example, in Japanese U.S. Pat. No. 3,184,969, a welding light emitted from a molten portion during laser welding is optically transmitted using one optical fiber attached to a laser processing head, and a laser welding state is detected using a welding light measurement optical system attached to an outlet of the optical fiber.

CITATION LIST

Patent Literature

PTL 1: WO 2018/185973
PTL 2: Japanese Patent No. 3184969

SUMMARY

A laser processing method according to one aspect of the present disclosure is a laser processing method for scanning over a first member in a first direction while irradiating the first member with a laser beam emitted from an oscillator, and joining the first member and a second member adjacent to the first member by a molten portion, the laser processing method including: a step of measuring, in each of a first measurement region and a second measurement region different from the first measurement region, an intensity of a welding light radiated from at least one of the first member and the second member by irradiation with the laser beam, the welding light including one of a heat radiation light, a plasma light, and a reflected light; and a step of evaluating a processing state based on the intensity of the welding light measured in each of the first measurement region and the second measurement region, in which the first measurement region and the second measurement region are aligned in a second direction intersecting the first direction.

A laser processing device according to one aspect of the present disclosure is a laser processing device that scans over a first member in a first direction while irradiating the first member with a laser beam, and joins the first member and a second member adjacent to the first member by a molten portion, the laser processing device including: an oscillator that emits a laser beam; an irradiation optical system that guides the laser beam to the first member; a stage that moves the first member and the second member relative to the laser beam to cause the laser beam to scan in the first direction; a measurement optical system that guides, from each of a first measurement region and a second measurement region different from the first measurement region, a welding light radiated from at least one of the first member and the second member by irradiation with the laser beam, including one of a heat radiation light, a plasma light, and a reflected light; a first sensor that measures an intensity of the welding light guided from the first measurement region to the measurement optical system; a second sensor that measures an intensity of the welding light guided from the second measurement region to the measurement optical system; and a determination unit that evaluates a processing state based on the intensity of the welding light measured in each of the first measurement region and the second measurement region, in which the first measurement region and the second measurement region are aligned in a second direction intersecting the first direction.

DETAILED DESCRIPTION

Figure 1:
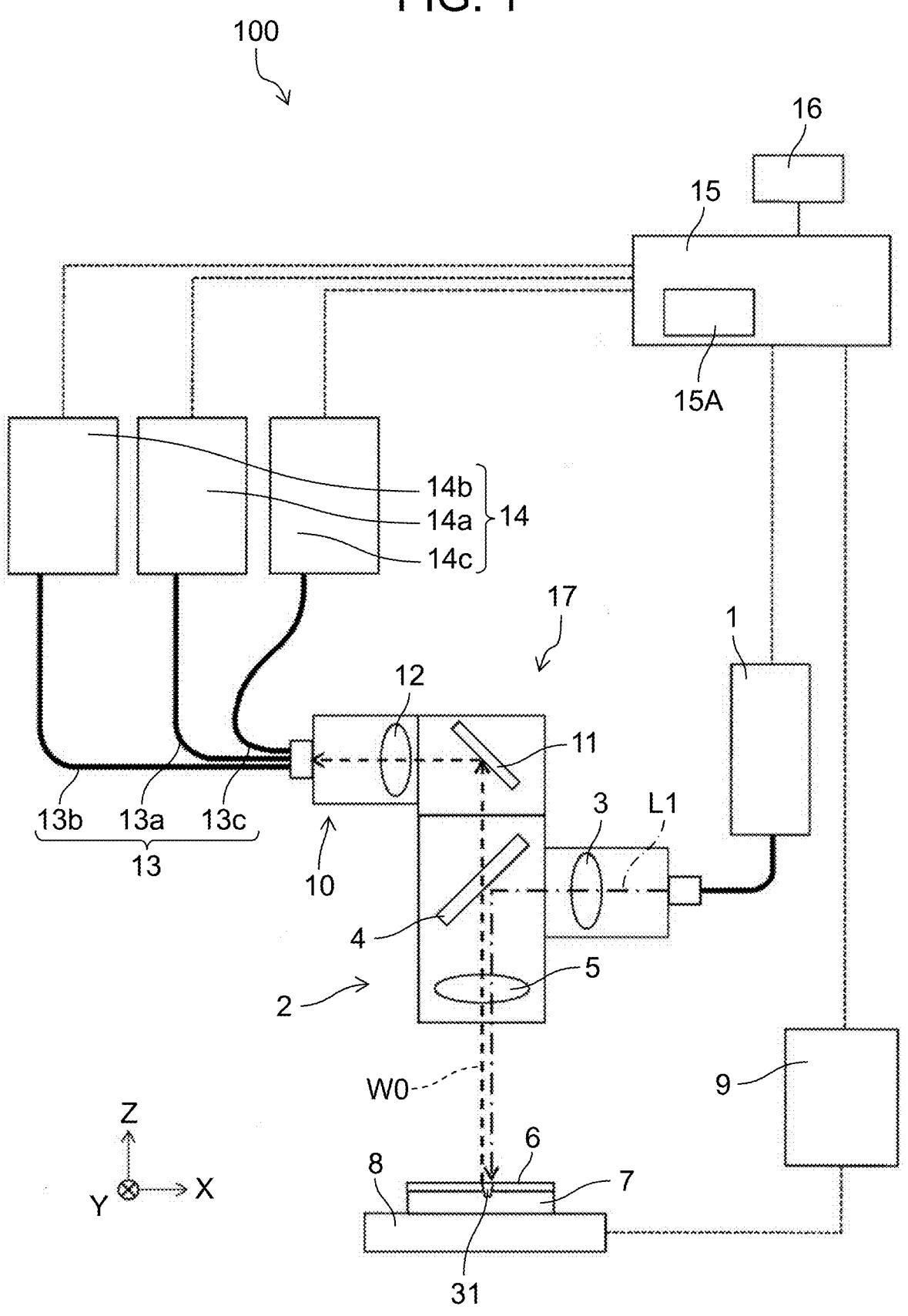
FIG. 1 is a schematic view of a laser processing device according to an exemplary embodiment of the present disclosure.

In the laser processing methods described in WO 2018/185973 and Japanese Patent No. 3184969, welding lights in the vicinity of a molten portion around a laser irradiation position are collectively measured. Therefore, it is difficult to accurately evaluate a detailed state of a laser molten portion and an abnormal melting state occurring around the molten portion. There is accordingly still room for improvement in terms of evaluation accuracy of a processing state.

Therefore, an object of the present disclosure is to solve the above-described conventional problem, and to improve evaluation accuracy of a processing state in laser processing.

A laser processing method according to a first aspect of the present disclosure is a laser processing method for scanning over a first member in a first direction while irradiating the first member with a laser beam emitted from an oscillator, and joining the first member and a second member adjacent to the first member by a molten portion, the laser processing method including: a step of measuring, in each of a first measurement region and a second measurement region different from the first measurement region, an intensity of a welding light radiated from at least one of the first member and the second member by irradiation with the laser beam, the welding light including one of a heat radiation light, a plasma light, and a reflected light; and a step of evaluating a state of a laser processing based on the intensity of the welding light measured in each of the first measurement region and the second measurement region, in which the first measurement region and the second measurement region are aligned in a second direction intersecting the first direction.

By providing two measurement regions by such a method, an intensity of the welding light measured in each of the measurement regions can be evaluated individually. Therefore, evaluation accuracy of a processing state during laser processing can be improved.

In a laser processing method according to a second aspect of the present disclosure, the measuring step may include condensing the welding light from the first measurement region on a first optical fiber using an optical system to measure, by a first sensor, the welding light transmitted by the first optical fiber; and condensing the welding light from the second measurement region on a second optical fiber using the same optical system to measure, by a second sensor, the welding light transmitted by the second optical fiber.

By such a method, the welding lights measured in the measurement regions can be individually transmitted to the first sensor and the second sensor, respectively, so that the intensity of the welding light can be evaluated. Therefore, evaluation accuracy of a processing state during laser processing can be further improved. In addition, by condensing the welding light from the first measurement region and the welding light from the second measurement region onto the optical fibers using the same optical system, the number of the optical systems and cost thereof for performing the laser processing method can be reduced.

In a laser processing method according to a third aspect of the present disclosure, the first measurement region and the second measurement region may be aligned in a direction orthogonal to the first direction.

With such a method, it is possible to arrange measurement regions in which an intensity of a welding light generated in a region on the side of an irradiation position of the laser beam can be measured more accurately.

In a laser processing method according to a fourth aspect of the present disclosure, the molten portion during normal welding may have a width in a direction orthogonal to the first direction, the first measurement region and the second measurement region each may have a diameter less than or equal to the width of the molten portion, and the first measurement region may include an irradiation position of the laser beam during normal welding.

By such a method, an intensity of a welding light generated in the molten portion and an intensity of a welding light generated in a portion other than the molten portion can be individually measured.

In a laser processing method according to a fifth aspect of the present disclosure, the first measurement region and the second measurement region may have a diameter equal to the width of the molten portion.

By such a method, more welding light can be measured in the molten portion.

In a laser processing method according to a sixth aspect of the present disclosure, the measuring step may include measuring the intensity of the welding light in a third measurement region different from the first measurement region and the second measurement region, the first measurement region, the second measurement region, and the third measurement region may be aligned adjacent to each other in a direction orthogonal to the first direction, the first measurement region may include an irradiation position of the laser beam during normal welding, and the second measurement region and the third measurement region may be arranged with the first measurement region interposed therebetween.

By such a method, an intensity of the welding light can be measured at the irradiation position of the laser beam and in the regions adjacent to both sides of the irradiation position, thereby further improving evaluation accuracy.

In a laser processing method according to a seventh aspect of the present disclosure, the evaluating step may include: comparing a signal intensity of the welding light measured in the first measurement region with a preset first threshold value; comparing a signal intensity of the welding light measured in the second measurement region with a preset second threshold value; and comparing a signal intensity of the welding light measured in the third measurement region with a preset third threshold value.

By such a method, a processing state in each measurement region can be evaluated.

In a laser processing method according to an eighth aspect of the present disclosure, the first threshold value may be a lower limit value, the second threshold value may be an upper limit value, and the third threshold value may be an upper limit value, and the evaluating step may include determining that melting abnormality has occurred on one side of the molten portion when the signal intensity measured in the first measurement region is smaller than the first threshold value, the signal intensity measured in the second measurement region is smaller than the second threshold value, and the signal intensity measured in the third measurement region is larger than the third threshold value.

By such a method, it is possible to specify a region where melting abnormality has occurred, and to further improve evaluation accuracy of a processing state in laser processing.

In a laser processing method according to a ninth aspect of the present disclosure, the first threshold value may be an upper limit value, the second threshold value may be an upper limit value, and the third threshold value may be an upper limit value, and the evaluating step may include determining that a focal position of the laser beam is deviated along an irradiation direction of the laser beam when the signal intensity measured in the first measurement region is smaller than the first threshold value, the signal intensity measured in the second measurement region is larger than the second threshold value, and the signal intensity measured in the third measurement region is larger than the third threshold value.

By such a method, deviation of a focal position can be determined, and evaluation accuracy of a processing state during laser processing can be further improved.

A laser processing device according to a tenth aspect of the present disclosure is a laser processing device that scans over a first member in a first direction while irradiating the first member with a laser beam, and joins the first member and a second member adjacent to the first member by a molten portion, the laser processing device including: an oscillator that emits a laser beam; an irradiation optical system that guides the laser beam to the first member; a stage that moves the first member and the second member relative to the laser beam to cause the laser beam to scan in the first direction; a measurement optical system that guides, from each of a first measurement region and a second measurement region different from the first measurement region, a welding light radiated from at least one of the first member and the second member by irradiation with the laser beam, the welding light including any one of a heat radiation light, a plasma light, and a reflected light; a first sensor that measures an intensity of the welding light guided from the first measurement region to the measurement optical system; a second sensor that measures an intensity of the welding light guided from the second measurement region to the measurement optical system; and a determination unit that evaluates a state of a laser processing based on the intensity of the welding light measured in each of the first measurement region and the second measurement region; in which the first measurement region and the second measurement region are aligned in a second direction intersecting the first direction.

With such a configuration, an intensity of the welding light measured in each measurement region can be individually evaluated. Therefore, evaluation accuracy of a processing state during laser processing can be improved.

A laser processing device according to an eleventh aspect of the present disclosure may further include: a first optical fiber that transmits, to the first sensor, the welding light guided from the first measurement region to the measurement optical system; and a second optical fiber that transmits, to the second sensor, the welding light guided from the second measurement region to the measurement optical system.

With such a configuration, the welding lights measured in the respective measurement regions can be individually transmitted to the first sensor and the second sensor, and an intensity of the welding light can be evaluated. Therefore, evaluation accuracy of a processing state during laser processing can be further improved.

In the following, a laser processing method according to an exemplary embodiment will be described in detail with reference to the drawings.

(Exemplary Embodiment)

Figure 2A:
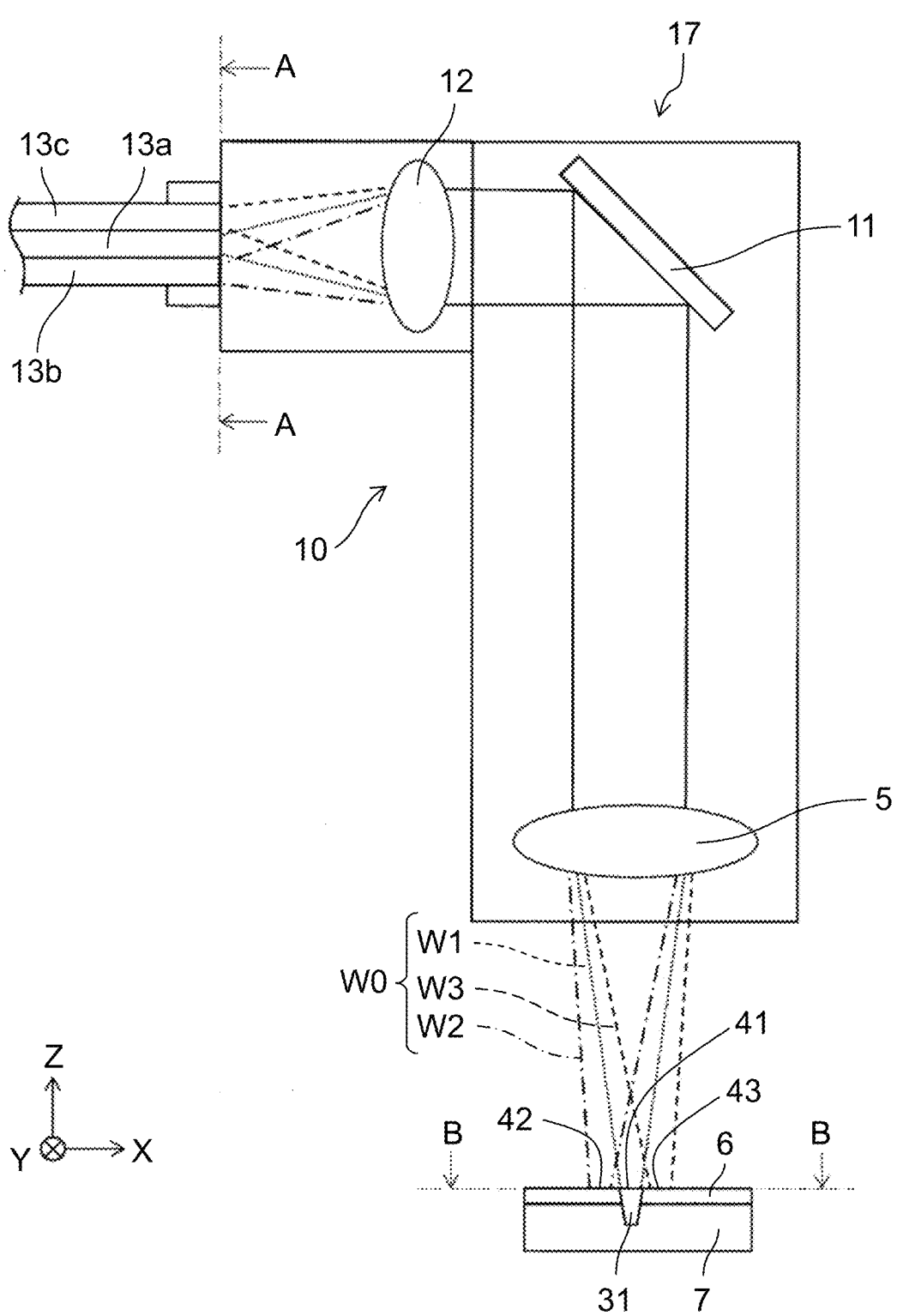
FIG. 2A is a partially enlarged view of the laser processing device.
Figure 2B:
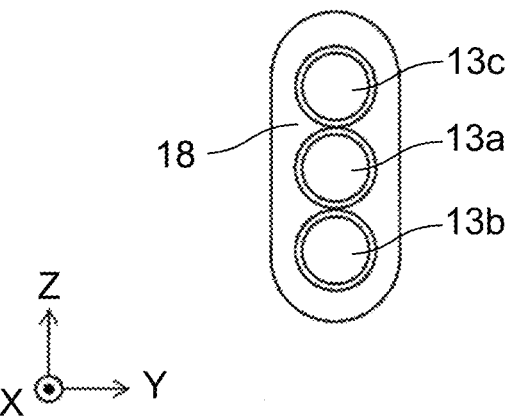
FIG. 2B is a sectional view taken along line A-A in FIG. 2A.
Figure 2C:
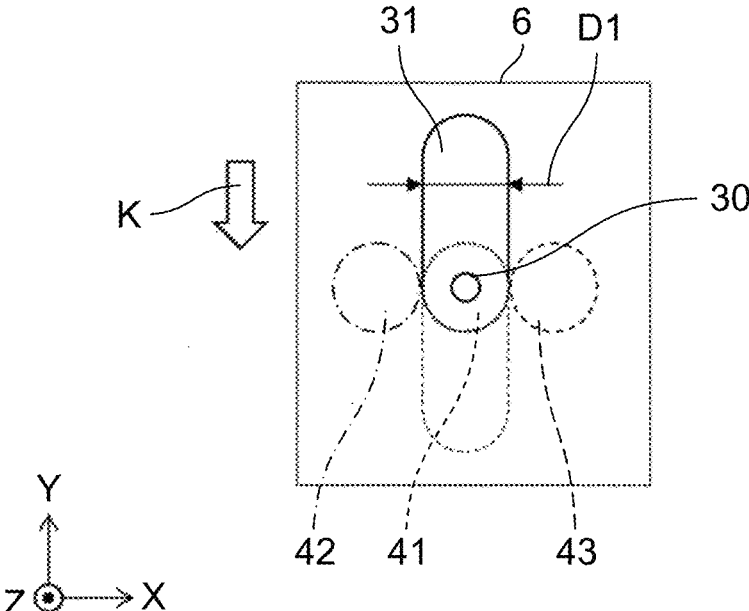
FIG. 2C is a plan view taken along line B-B in FIG. 2A.

FIG. 1 is a schematic view of a laser processing device according to an exemplary embodiment of the present disclosure. FIG. 2A is a partially enlarged view of laser processing device 100. FIG. 2B is a sectional view taken along line A-A of FIG. 2A, and FIG. 2C is a sectional view taken along line B-B of FIG. 2A. In FIG. 2A, a part of laser processing device 100 is omitted for convenience.

As illustrated in FIG. 1, laser processing device 100 is a device that radiates laser beam L1 and joins members 6 and 7 to be processed via molten portion 31 formed by the irradiation of laser beam L1. Laser processing device 100 includes laser oscillator 1, irradiation optical system 2, stage 8, measurement optical system 10, optical fiber 13, measurement unit 14, control unit 15, and storage unit 16.

Laser oscillator 1 is a device that oscillates laser beam L1. Laser beam L1 oscillated from laser oscillator 1 is guided to irradiation optical system 2, for example, directly or by using a transmission means such as an optical fiber. Laser oscillator 1 oscillates, for example, laser beam L1 having a wavelength of 1070 nm.

Irradiation optical system 2 is an optical system that guides and condenses laser beam L1 from laser oscillator 1 on a surface of member 6. Irradiation optical system 2 is configured with a plurality of optical elements, and has, for example, collimating lens 3, dichroic mirror 4, and condensing lens 5. Laser beam L1 is made a parallel beam by collimating lens 3, is bent at a right angle by dichroic mirror 4, is condensed by condensing lens 5, and is applied to the surface of member 6. Dichroic mirror 4 has a surface coated so that only a wavelength of laser beam L1 is totally reflected and the other wavelengths are transmitted. Note that in the present specification, "total reflection" means reflection of 99% or more, and the remainder of about 1% of laser beam L1 passes through dichroic mirror 4.

Stage 8 is a device that supports members 6 and 7 and moves members 6 and 7 with respect to laser beam L1 condensed by irradiation optical system 2. Stage 8 supports member 7, and member 6 arranged to overlap member 7 in an irradiation direction. Member 7 is adjacent to member 6. In addition, stage 8 is controlled by stage control unit 9, and linearly moves with members 6 and 7 mounted thereon under the control of stage control unit 9. When the movement of stage 8 and the irradiation with laser beam L1 are synchronized with each other, molten portion 31 is formed along a certain scanning direction (Y direction, first direction), and member 6 and member 7 are joined, i.e., laser-welded by molten portion 31. In the present exemplary embodiment, members 6 and 7 are plate-shaped members. Members 6 and 7 may be members having portions that expand in a plane direction orthogonal to a thickness direction of members 6 and 7 so that members 6 and 7 can overlap each other in a region to be irradiated.

When members 6 and 7 are irradiated with laser beam L1, molten portion 31 is formed, and welding light W0 is radiated from the surface of member 6. As illustrated in FIG. 2A, welding light W0 includes welding light W1 radiated from molten portion 31 and, for example, welding lights W2 and W3 radiated from a periphery of molten portion 31. Welding light W0 includes plasma light that is a visible light, heat radiation light highly correlated with a temperature of member 6, reflected light of laser beam L1, or the like. Welding light W0 radiated from member 6 is guided to measurement optical system 10, for example, directly or by using a transmission means such as a lens.

Measurement optical system 10 is an optical system that guides welding light W0 from the surface of member 6 to optical fiber 13 to form an image. As illustrated in FIG. 1, measurement optical system 10 is configured with a plurality of optical elements, and has, for example, condensing lens 5, dichroic mirror 4, total reflection mirror 11, and imaging lens 12. In the present exemplary embodiment, measurement optical system 10 shares dichroic mirror 4 and condensing lens 5 with irradiation optical system 2. Although in condensing lens 5 and dichroic mirror 4, laser beam L1 and welding light W0 are illustrated being deviated for the sake of convenience, laser beam L1 and welding light W0 are coaxial in practice. Welding light W0 passes through condensing lens 5 and dichroic mirror 4 and is bent at a right angle by total reflection mirror 11, so that an image is formed on an end surface of optical fiber 13 by imaging lens 12.

In addition, measurement optical system 10 is housed in laser processing head 17 together with irradiation optical system 2. Laser processing head 17 forms a casing that houses irradiation optical system 2 and measurement optical system 10, and prevents laser beam L1 and welding light W0 from leaking to the outside of the casing.

Optical fiber 13 is a transmission means that transmits welding light W0 guided to measurement optical system 10 to measurement unit 14. In the present exemplary embodiment, laser processing device 100 includes three optical fibers 13a, 13b, and 13c. As illustrated in FIG. 2A, one ends of optical fibers 13a, 13b, and 13c are connected to laser processing head 17 so as to face imaging lens 12. As illustrated in FIG. 2B, the one ends of three optical fibers 13a, 13b, and 13c are linearly and closely arranged along a Z direction, and are fixed by holder 18. As illustrated in FIG.

1, the other ends of optical fibers 13a, 13b, and 13c are connected to measurement unit 14.

Such a structure enables laser processing device 100 to measure welding lights W1, W2, and W3 radiated from three different measurement regions 41, 42, and 43 illustrated in FIG. 2A. In the present specification, the "measurement region" is a region of the surface of member 6, the region being at and around molten portion 31, and represents a region where a welding light can be generated in normal or abnormal welding. The fact that measurement regions 41, 42, and 43 are different from each other means that the regions each have a difference on the surface of member 6. In other words, measurement regions 41, 42, and 43 are regions that do not match. Measurement regions 41, 42, 43 may be provided partially overlapping each other. In addition, measurement regions 41, 42, and 43 may be provided at intervals from each other. In the present exemplary embodiment, as illustrated in FIG. 2C, measurement regions 41, 42, and 43 are arranged so as not to overlap each other, and such that first measurement region 41 is in contact with second measurement region 42, and first measurement region 41 is in contact with third measurement region 43. More specifically, three measurement regions 41, 42, and 43 are adjacent to each other and linearly aligned in a second direction orthogonal to a first direction (hereinafter, referred to as scanning direction K). First measurement region 41 is arranged being sandwiched between second measurement region 42 and third measurement region 43. As illustrated in FIG. 2A, welding light W1 radiated from first measurement region 41 located in molten portion 31 is imaged on first optical fiber 13a. Welding light W2 radiated from second measurement region 42 located on one side of molten portion 31 is imaged on second optical fiber 13b. Welding light W3 radiated from third measurement region 43 located on the other side of molten portion 31 is imaged on third optical fiber 13c.

As illustrated in FIGS. 1 and 2A, optical fiber 13a transmits welding light W1 to measurement unit 14a, optical fiber 13b transmits welding light W2 to measurement unit 14b, and optical fiber 13c transmits welding light W3 to measurement unit 14c.

Figure 3:
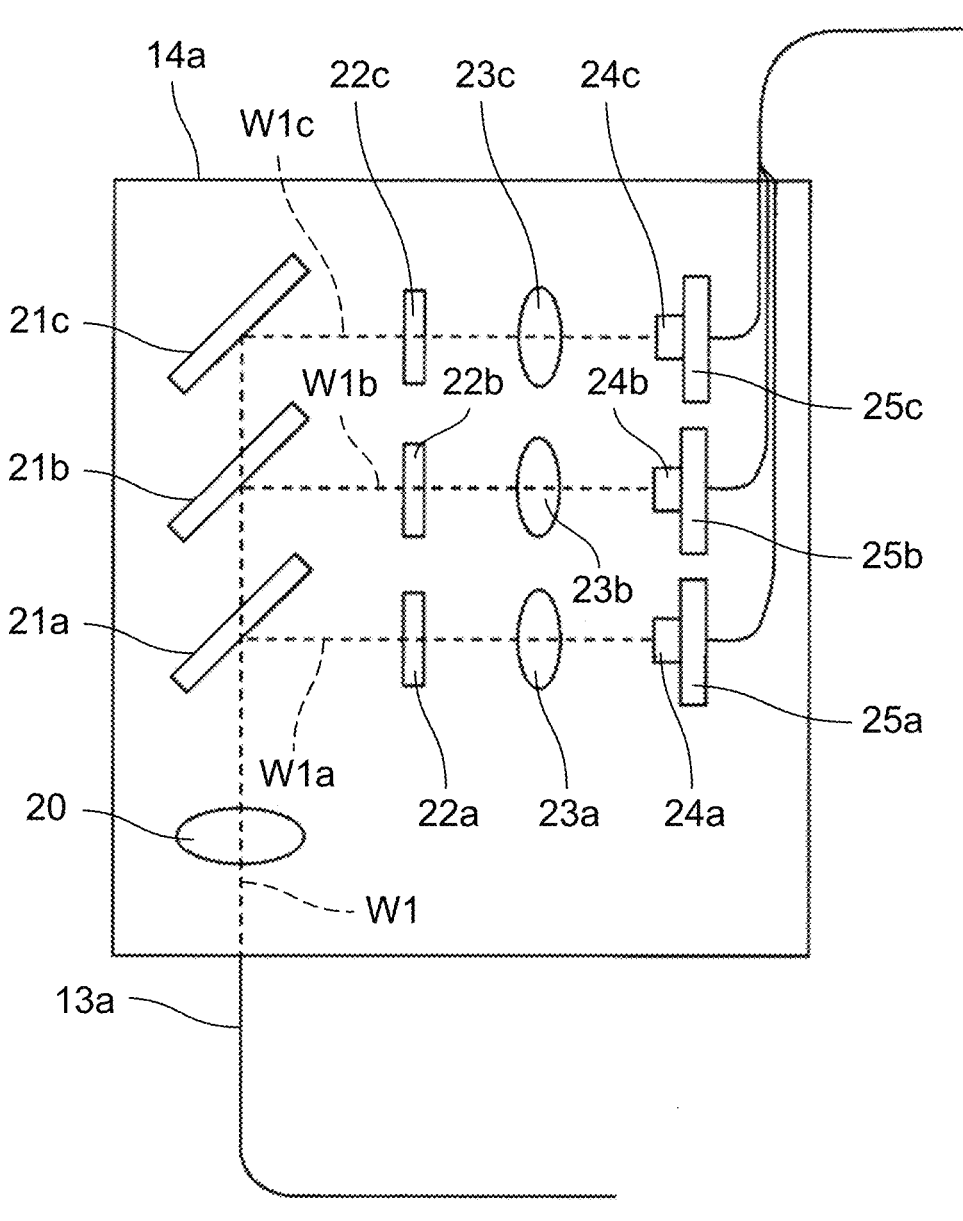
FIG. 3 is a schematic view of a measurement unit.

Measurement unit 14 is a device that measures an intensity of welding light W0 transmitted by optical fiber 13 and transmits a signal corresponding to the intensity to control unit 15. In the present exemplary embodiment, laser processing device 100 includes three measurement units 14a, 14b, and 14c corresponding to three optical fibers 13a, 13b, and 13c. Detailed configurations of measurement units 14a, 14b, and 14c will be described with reference to FIG. 3. FIG. 3 is a schematic view of measurement unit 14a. Other measurement units 14b and 14c may have the same structure as measurement unit 14a.

Measurement unit 14a is configured with a plurality of optical elements and sensors. Measurement unit 14a has, for example, collimating lens 20, reflection mirrors 21a, 21b, and 21c, filters 22a, 22b, and 22c, imaging lenses 23a, 23b, and 23c, light receiving sensors 24a, 24b, and 24c, and amplifiers 25a, 25b, and 25c. Welding light W1 passing through optical fiber 13a is converted into a parallel light by collimating lens 20, and then separated for each wavelength by the plurality of reflection mirrors 21a, 21b, and 21c. In the present exemplary embodiment, reflection mirrors 21a, 21b, and 21c separate welding light W1 into three kinds of wavelengths. Specifically, from welding light W1, reflection mirror 21a separates plasma light W1a (wavelength of 400 nm to 700 nm), reflection mirror 21b separates laser reflected light W1b (wavelength of 1070 nm), and reflection mirror 21c separates heat radiation light W1c (wavelength of 1300 nm). Each of reflection mirrors 21a, 21b, and 21c has a front surface coated so as to reflect only the wavelength to be separated and transmit the other wavelengths. Welding lights W1a, W1b, and W1c reflected by reflection mirrors 21a, 21b, and 21c pass through corresponding filters 22a, 22b, and 22c, respectively. Welding lights W1a, W1b, and W1c having passed are incident on corresponding light receiving sensors 24a, 24b, and 24c by the corresponding imaging lenses 23a, 23b, and 23c, respectively. Signals from light receiving sensors 24a, 24b, and 24c are converted into electric signals corresponding to the intensities by corresponding amplifiers 25a, 25b, and 25c, and transmitted to control unit 15.

Control unit 15 is a controller that controls entire laser processing device 100. Control unit 15 includes a general-purpose processor such as a central processing unit (CPU) or a microprocessor unit (MPU) that achieves a predetermined function by executing a program. Control unit 15 achieves various controls in laser processing device 100 by calling up and executing a control program stored in storage unit 16 to be described later. Control unit 15 is not limited to one that achieves a predetermined function by cooperation of hardware and software, and may be a hardware circuit designed exclusively for achieving a predetermined function. In other words, control unit 15 can be achieved by various processors such as a CPU, an MPU, a graphics processing unit (GPU), a field programmable gate array (FPGA), a digital signal processor (DSP), and an application-specific integrated circuit (ASIC). Control unit 15 achieves, for example, synchronization control of laser oscillator 1 and stage control unit 9.

Control unit 15 includes a general-purpose processor such as a CPU or an MPU that functions as determination unit 15A. Determination unit 15A evaluates a welding state based on the intensities of welding lights W1, W2, and W3 measured in measurement regions 41, 42, and 43. More specifically, determination unit 15A determines whether abnormality of the welding state has occurred or not based on the intensities of welding lights W1, W2, W3. The abnormality of the welding state includes excessive heating or melting, insufficient heating or melting, irradiation in a region other than a region to be irradiated, and the like. For example, determination unit 15A compares intensity signals of welding lights W1, W2, and W3 with a preset reference value, and determines whether or not abnormality in the welding state has occurred in measurement regions 41, 42, and 43.

Storage unit 16 is a recording medium that records various kinds of information. Storage unit 16 is achieved by, for example, a flash memory, a solid state device (SSD), a hard disk, other storage devices, or an appropriate combination thereof. Storage unit 16 stores a control program executed by control unit 15, various kinds of information detected for evaluation of a welding state, and the like. Storage unit 16 stores, for example, application 16a for calculation processing of the intensity signals of welding lights W1, W2, and W3. Storage unit 16 may store preset reference values related to welding lights W1, W2, and W3, for example, upper limit signal intensities Pau, Pbu, and Pcu, lower limit signal intensity Pad to be described later, or the like.

Here, measurement regions 41, 42, and 43 will be described in more detail with reference to FIG. 2C. First measurement region 41 is a circular region centered on irradiation position 30 of laser beam L1 during normal welding and having the same diameter as melting width D1.

Melting width D1 is a width of molten portion 31 during normal welding to be described later, the width being measured in the second direction orthogonal to scanning direction K. In other words, first measurement region 41 is formed so as to be inscribed in molten portion 31 during normal welding. Similarly to first measurement region 41, second measurement region 42 and third measurement region 43 are circular regions on both sides of first measurement region 41 and having the same diameter as melting width D1. Second measurement region 42 and third measurement region 43 may have the same dimension as first measurement region 41.

A relationship between dimensions of measurement regions 41, 42, and 43 and dimensions of optical fibers 13a, 13b, and 13c will be described. In the present exemplary embodiment, focal lengths of condensing lens 5 and imaging lens 12 are equal to each other. In this case, an imaging ratio in measurement optical system 10 is 1:1, and the dimensions of measurement regions 41, 42, and 43 coincide with dimensions of end surfaces of optical fibers 13a, 13b, and 13c. Therefore, the diameters of measurement regions 41, 42, and 43 can be determined by core diameters of optical fibers 13a, 13b, and 13c.

Assuming that the core diameter of each of optical fibers 13a, 13b, and 13c is represented as ds, the focal length of condensing lens 5 is represented as f1, and the focal length of imaging lens 12 with respect to optical fibers 13a, 13b, and 13c is represented as f2, a diameter dm of each of measurement regions 41, 42, and 43 is expressed by Equation (1).

$$dm=ds\times f1/f2 \tag{1}$$

For example, in a case where focal length f1 of condensing lens 5 is 150 μm and focal length f2 of imaging lens 12 to optical fiber 13a is 150 μm, when optical fiber 13a having a core diameter of 300 μm is selected, diameter dm of first measurement region 41 can be set to 300 μm.

Figure 4A:
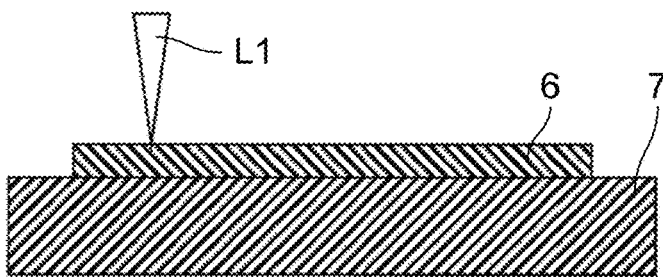
FIG. 4A is a sectional view of a welding state during normal welding.
Figure 4B:
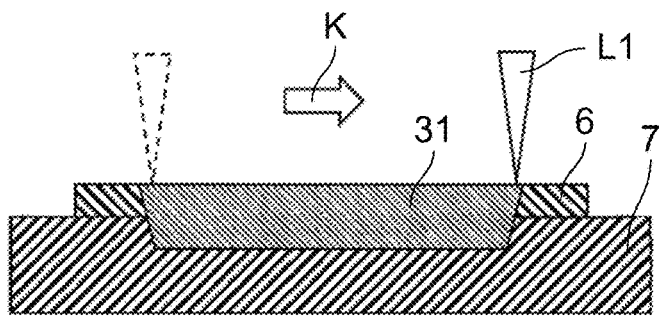
FIG. 4B is a sectional view of a welding state during normal welding.
Figure 4C:
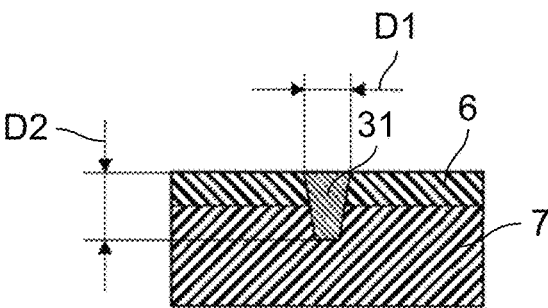
FIG. 4C is a sectional view of a welding state during normal welding.

Subsequently, a welding state during normal welding will be described with reference to FIGS. 4A to 4D. Normal welding means welding in which designed processing is performed and no abnormality occurs. FIGS. 4A to 4C are sectional views of a welding state during normal welding, and FIG. 4D is a graph illustrating a relationship between irradiation power and time during normal welding.

As illustrated in FIG. 4A, at the start of laser welding, member 6 arranged on member 7 is irradiated with laser beam L1. For example, member 7 is made of an aluminum material having a thickness of 1 mm, and member 6 is made of an aluminum material having a thickness of 0.2 mm. Laser beam L1 scans so as to move relative to member 6 in a straight line along scanning direction K. In the present exemplary embodiment, stage 8 (not illustrated) on which members 6 and 7 are mounted moves, so that laser beam L1 moves relative to member 6. For example, a laser output of laser beam L1 is 400 W, and a scanning speed is 500 mm/s.

As illustrated in FIG. 4B, molten portion 31 is formed in members 6 and 7 after irradiation with laser beam L1. As shown in FIG. 4C, when viewed from scanning direction K, molten portion 31 has melting width D1 of approximately 300 μm and melting depth D2 of approximately 400 μm.

Figure 4D:
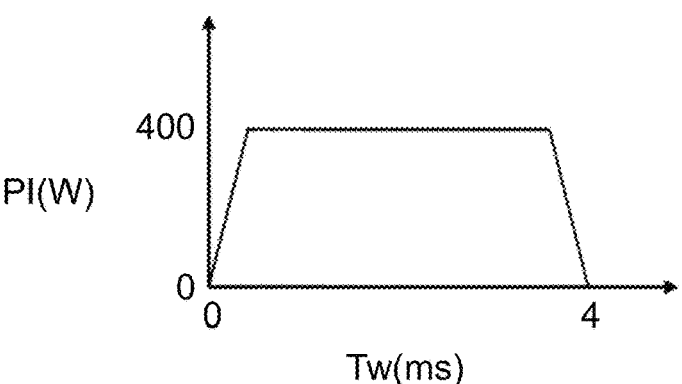
FIG. 4D is a graph showing a relationship between irradiation power and time during normal welding.

As illustrated in FIG. 4D, a waveform of output P1 of laser beam L1 is set to a trapezoidal waveform, and includes a slow-up portion, a flat portion, and a slow-down portion in this order at time Tw. Provision of the slow-up portion and the slow-down portion makes it possible to prevent spatter and depression during laser welding. Since the waveform of output P1 of laser beam L1 is a trapezoidal waveform, a cross-sectional shape of molten portion 31 is also an inverted trapezoidal shape as illustrated in FIG. 4B. A total irradiation time of laser beam L1 is, for example, 4 ms.

Subsequently, an actual welding state will be described with reference to FIGS. 5A to 5D. FIGS. 5A to 5D are appearance photographs of an actual molten portion.

Figure 5A:
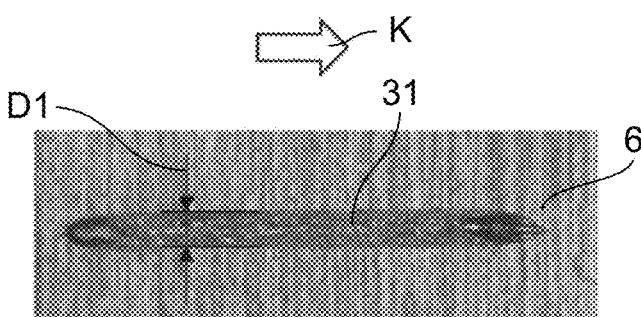
FIG. 5A is an appearance photograph of an actual molten portion.

FIG. 5A is an appearance photograph of a molten portion during normal welding. During normal welding, molten portion 31 has certain melting width D1 and has a shape conforming to designed laser welding.

Figure 5B:
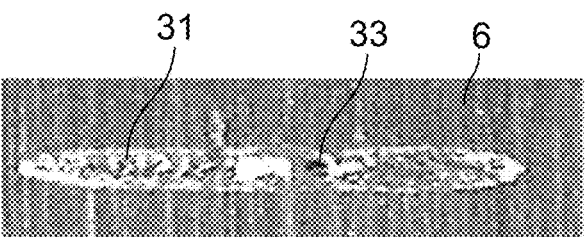
FIG. 5B is an appearance photograph of an actual molten portion.

FIG. 5B is an appearance photograph of a molten portion taken when abnormal molten portion 33 is generated at the center of molten portion 31. FIG. 5B illustrates an example in which perforation occurs as melting abnormality. Perforation abnormality indicates a state in which a degree of melting is insufficient, such as a state in which a part of melting is not normally performed and a through hole is formed in member 6, or a state in which molten portion 31 is recessed in a concave shape. Insufficient melting could be caused by, for example, vaporization of a material due to excessive heating, occurrence of spatter, influence of foreign substances present in an object to be processed, or the like.

Figure 5C:
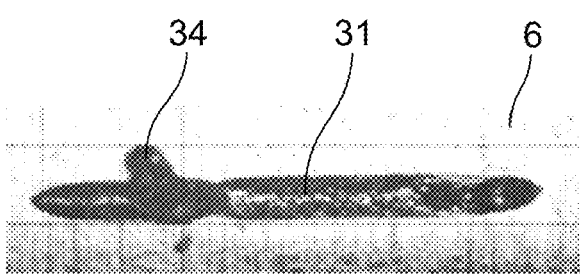
FIG. 5C is an appearance photograph of an actual molten portion.

FIG. 5C is an appearance photograph of a molten portion when left-side abnormal molten portion 34 is generated on one side of molten portion 31. Left-side abnormal molten portion 34 is an abnormal molten portion generated on the left side of molten portion 31 with respect to scanning direction K. Left-side abnormal molten portion 34 is generated, for example, when a resin foreign substance or the like is caught in a joining interface, and indicates a state in which molten portion 31 is formed at an unnecessary part due to excessive melting. Therefore, the melting width of molten portion 31 increases in a part of molten portion 31 in which left-side abnormal molten portion 34 is generated.

Figure 5D:
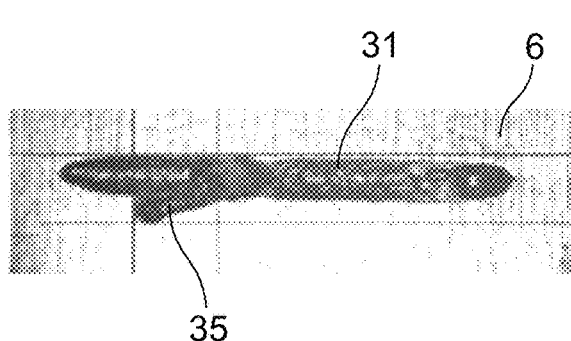
FIG. 5D is an appearance photograph of an actual molten portion.

FIG. 5D is an appearance photograph of a molten portion when right-side abnormal molten portion 35 is generated on the other side of molten portion 31. Right-side abnormal molten portion 35 is an abnormal molten portion generated on the right side of molten portion 31 with respect to scanning direction K. Right-side abnormal molten portion 35 is generated, for example, when a resin foreign substance or the like is caught in the joining interface, and indicates a state in which molten portion 31 is formed at an unnecessary part due to excessive melting. Therefore, the melting width of molten portion 31 increases in a part of molten portion 31 in which right-side abnormal molten portion 35 is generated.

Here, as Comparative Example, a laser processing method using one measurement region will be described.
(Comparative Example)

Figure 6:
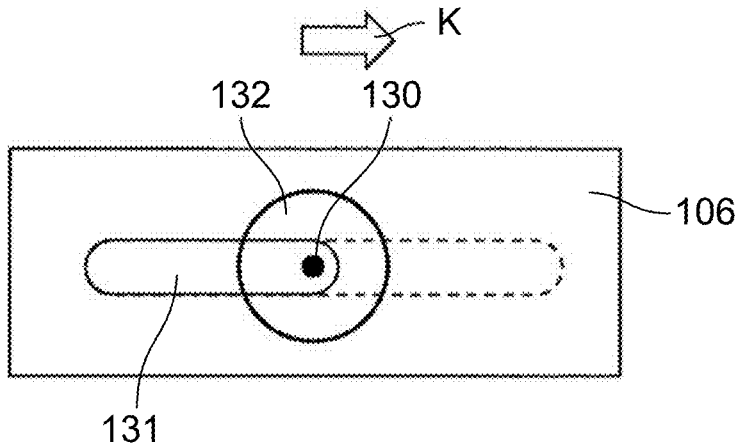
FIG. 6 is a view for explaining a measurement region in which a heat radiation light is measured in Comparative Example.

First, a measurement region in Comparative Example will be described with reference to FIG. 6. FIG. 6 is a view for explaining a measurement region in which a heat radiation light is measured in Comparative Example.

As illustrated in FIG. 6, irradiation position 130 on member 106 is irradiated with a laser beam (not illustrated). Member 106 melts around irradiation position 130 to form molten portion 131. A welding light (not shown) is generated from molten portion 131 in the vicinity of irradiation position 130. The welding light is measured in measurement region 132. Measurement region 132 is arranged to include irradiation position 130, and the center of measurement region 132 may be arranged to coincide with irradiation position 130. Measurement region 132 has a diameter larger than a melting width of molten portion 131, for example, three times larger the melting width. Therefore, welding lights radiated in and around molten portion 131 are collectively measured.

Subsequently, Comparative Example will be described with reference to FIGS. 7A to 7D. FIGS. 7A to 7D are diagrams for explaining a signal intensity of a heat radiation light in Comparative Example. In FIGS. 7A to 7D, the view with "(i)" shows a welding state, and the diagram with "(ii)" shows a signal intensity of a welding light measured in measurement region 132. In Comparative Example, a heat radiation light is measured as an example of a welding light.

Figure 7A:
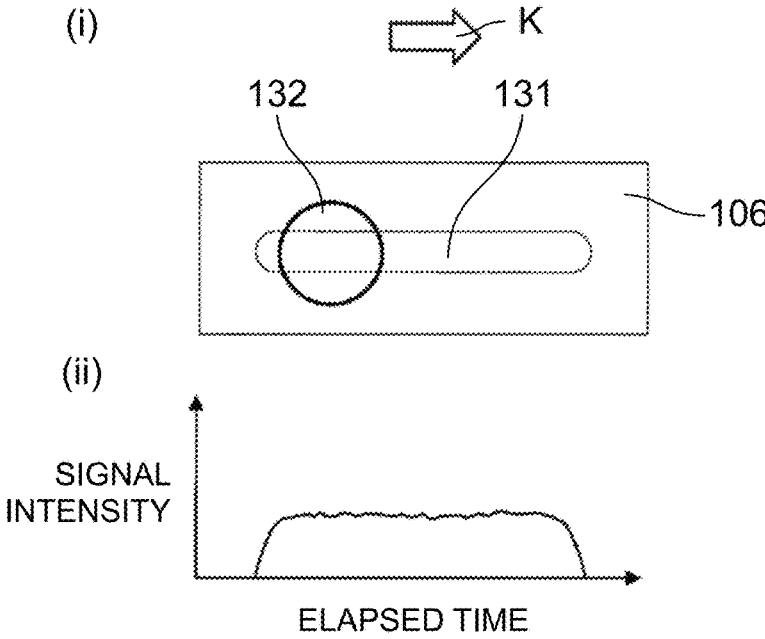
FIG. 7A is a diagram for explaining a signal intensity of a heat radiation light in Comparative Example.

FIG. 7A illustrates a signal intensity of a heat radiation light measured during normal welding in Comparative Example. As illustrated in (i) of FIG. 7A, when laser welding is normally performed, member 106 is melted and joined. At the time of laser irradiation, a heat radiation light corresponding to a melting state such as a melting temperature and a melting area is radiated. As illustrated in (ii) of FIG. 7A, a signal intensity proportional to the heat radiation light is measured in measurement region 132.

Figure 7B:
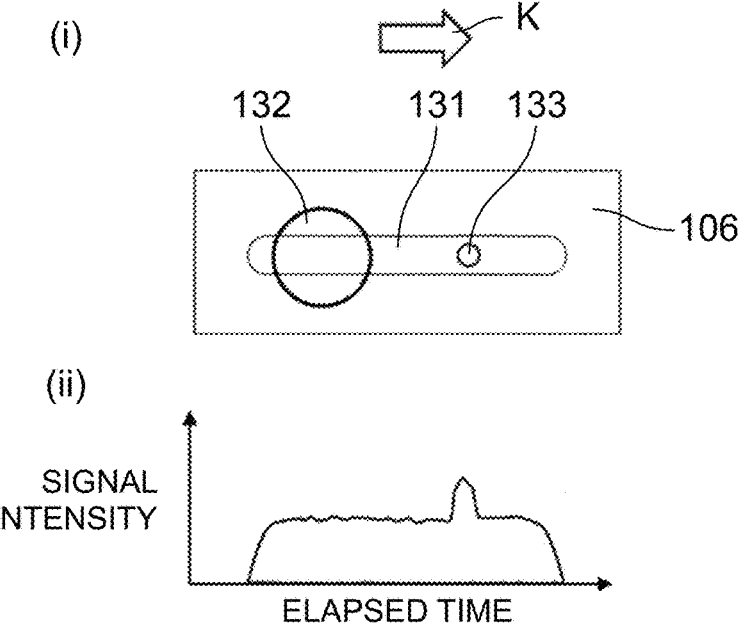
FIG. 7B is a diagram for explaining a signal intensity of a heat radiation light in Comparative Example.

FIG. 7B illustrates a signal intensity of a heat radiation light measured when an abnormal molten portion is generated at the center of molten portion 131 in Comparative Example. As illustrated in (i) of FIG. 7B, since when abnormal molten portion 133 such as perforation, protrusion, or recess is generated in the central portion of molten portion 131, abnormal molten portion 133 has a higher temperature than normal molten portion 131, the signal intensity of the heat radiation light also rapidly increases to form a peak. Therefore, as illustrated in (ii) of FIG. 7B, the occurrence of the melting abnormality can be estimated in measurement region 132 from the formation of the peak in the signal intensity.

Figure 7C:
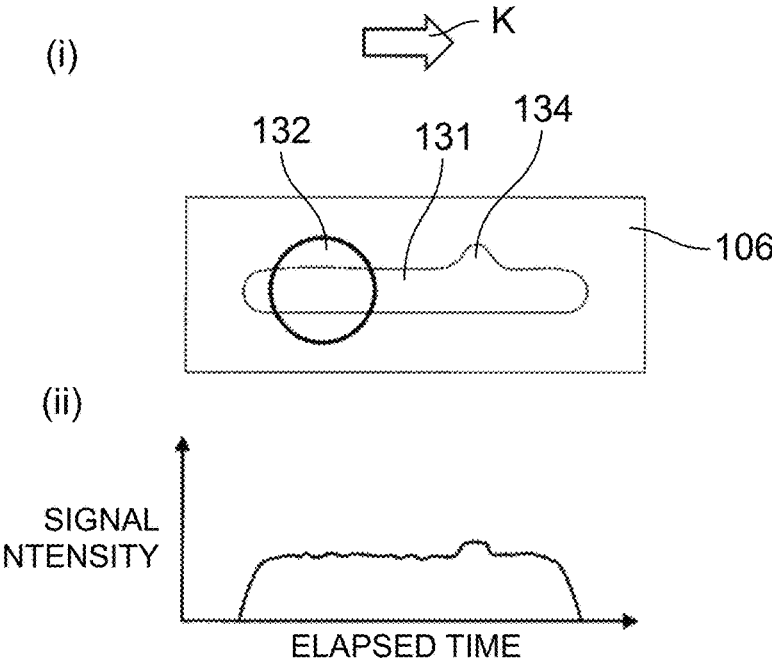
FIG. 7C is diagram for explaining a signal intensity of a heat radiation light in Comparative Example.

FIG. 7C illustrates a signal intensity of a heat radiation light measured when an abnormal molten portion is generated on one side of molten portion 131 in Comparative Example. When left-side abnormal molten portion 134 is generated as illustrated in (i) of FIG. 7C, a change in a signal intensity of a heat radiation light is small as compared with the case illustrated in (ii) of FIG. 7B. Therefore, as illustrated in (ii) of FIG. 7C, the change is buried in the fluctuation of the heat radiation light from molten portion 131 at the normal time, and it is accordingly difficult to estimate that the melting abnormality has occurred.

Figure 7D:
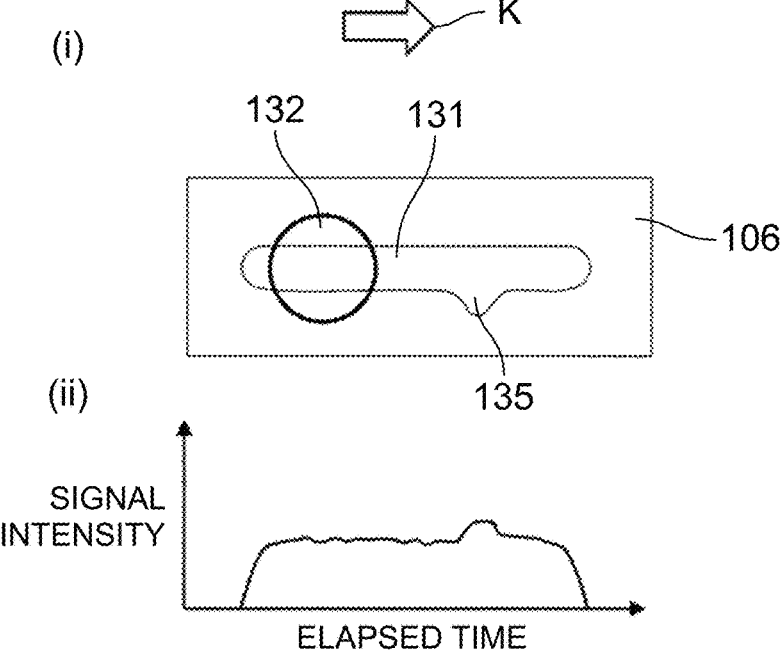
FIG. 7D is a diagram for explaining a signal intensity of a heat radiation light in Comparative Example.
Figure 8A:
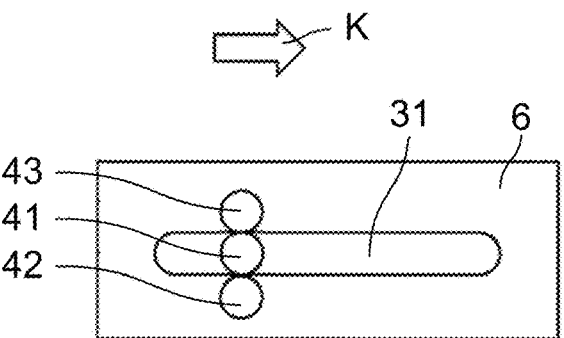
FIG. 8A is a diagram for explaining a signal intensity of a heat radiation light.
Figure 8B:
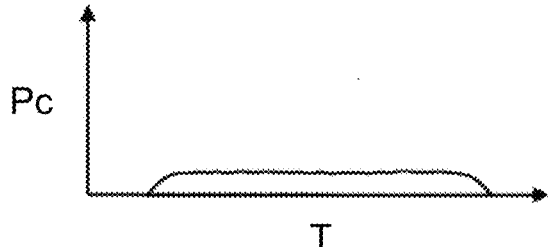
FIG. 8B is a diagram for explaining a signal intensity of a heat radiation light.
Figure 8C:
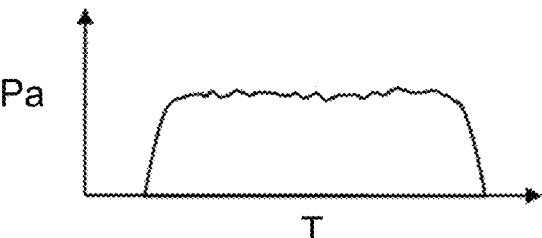
FIG. 8C is a diagram for explaining a signal intensity of a heat radiation light.
Figure 8D:
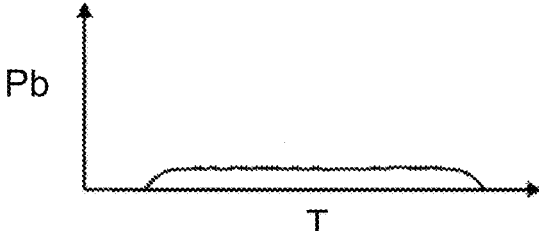
FIG. 8D is a diagram for explaining a signal intensity of a heat radiation light.

FIG. 7D illustrates a signal intensity of a heat radiation light measured when an abnormal molten portion is generated on the other side of molten portion 131 in Comparative Example. When left-side abnormal molten portion 134 is generated as illustrated in (i) of FIG. 7D, a signal intensity similar to the signal intensity of the heat radiation light illustrated in (ii) of FIG. 7C is measured. Therefore, it is difficult to determine whether the abnormal molten portion is left-side abnormal molten portion 134 or right-side abnormal molten portion 135.

On the other hand, in the laser processing method in the present exemplary embodiment, three measurement regions 41, 42, and 43 are provided. The laser processing method using measurement regions 41, 42, and 43 will be described with reference to FIGS. 8A to 13D. FIGS. 8A to 13 are diagrams for explaining a signal intensity of a heat radiation light. In FIGS. 8A to 13, the drawings with "(a)" show a welding state, and the drawings with "(b)", "(c)", and "(d)" show signal intensities of welding lights measured in first measurement region 41, second measurement region 42, and third measurement region 43, respectively.

As described above, three measurement regions 41, 42, and 43 are aligned in the direction orthogonal to scanning direction K of the laser beam, and each have the same diameter as melting width D1 of molten portion 31. In the following description, as an example of a welding light, a heat radiation light is measured, and signal intensities of the heat radiation lights emitted from measurement regions 41, 42, and 43 are represented as signal intensities Pa, Pb, and Pc, respectively.

First, FIGS. 8A to 8D illustrate signal intensities Pa, Pb, and Pc of the heat radiation lights measured during normal welding. In first measurement region 41, member 6 is melted, a heat radiation light corresponding to a melting temperature is emitted, and signal intensity Pa is measured. On the other hand, in measurement regions 42 and 43, since member 6 is not melted and is heated only by heat conduction, the heat radiation lights emitted from measurement regions 42 and 43 are less than the heat radiation emitted from first measurement region 41. Therefore, signal intensities Pb and Pc are lower than signal intensity Pa.

Figure 9A:
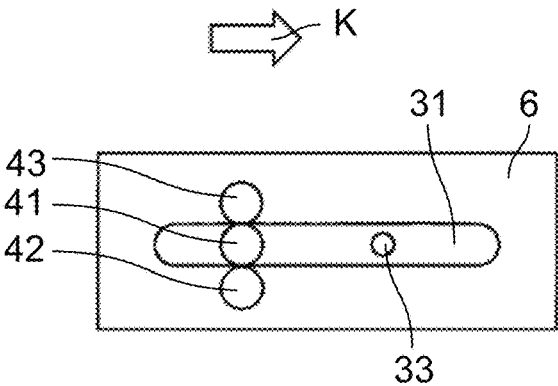
FIG. 9A is a diagram for explaining a signal intensity of a heat radiation light.
Figure 9B:
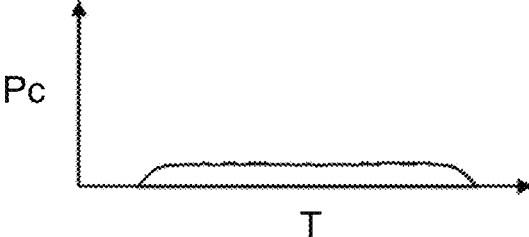
FIG. 9B is a diagram for explaining a signal intensity of a heat radiation light.
Figure 9C:
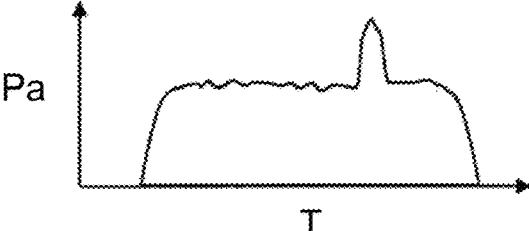
FIG. 9C is a diagram for explaining a signal intensity of a heat radiation light.
Figure 9D:
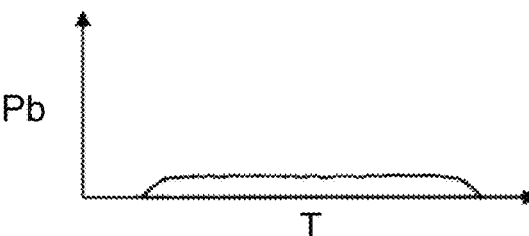
FIG. 9D is a diagram for explaining a signal intensity of a heat radiation light.

FIGS. 9A to 9D illustrate signal intensities Pa, Pb, and Pc of heat radiation lights measured when an abnormal molten portion is generated at the center of molten portion 31. As shown in FIG. 9A, when abnormal molten portion 33 such as perforation, protrusion, or recess is generated in the central portion of molten portion 31, abnormal molten portion 33 has a higher temperature than normal molten portion 31. Therefore, as illustrated in FIG. 9C, signal intensity Pa rapidly increases and a peak is formed. On the other hand, as illustrated in FIGS. 9B and 3D, in second measurement region 42 and third measurement region 43, since the emitted heat radiation lights do not change, signal intensities Pb and Pc do not change. From signal intensities Pa, Pb, and Pc of the heat radiation lights, it can be estimated that melting abnormality has occurred in the central portion of molten portion 31.

Figure 10A:
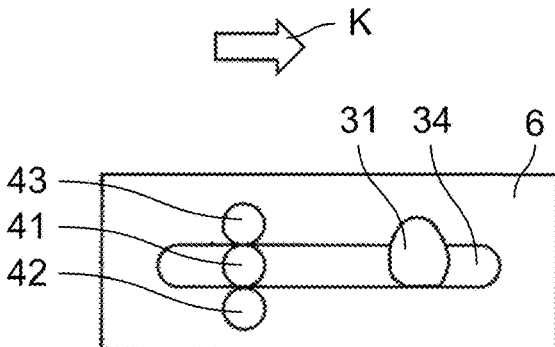
FIG. 10A is a diagram for explaining a signal intensity of a heat radiation light.
Figure 10B:
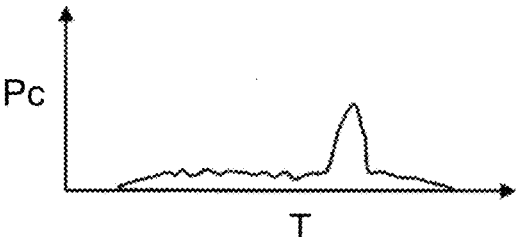
FIG. 10B is a diagram for explaining a signal intensity of a heat radiation light.
Figure 10C:
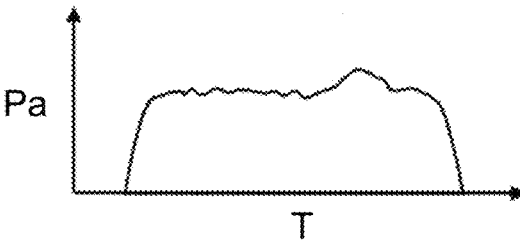
FIG. 10C is a diagram for explaining a signal intensity of a heat radiation light.
Figure 10D:
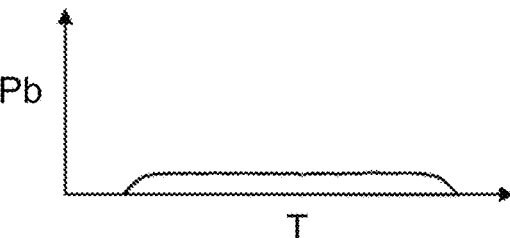
FIG. 10D is a diagram for explaining a signal intensity of a heat radiation light.

FIGS. 10A to 10D illustrate signal intensities Pa, Pb, and Pc of heat radiation lights measured when an abnormal molten portion has occurred on one side of molten portion 31. When left-side abnormal molten portion 34 is generated as illustrated in FIG. 10A, heat radiation lights emitted from measurement regions 41 and 43 are increased as compared with the case of normal molten portion 31. Therefore, as illustrated in FIGS. 10B and 10C, signal intensities Pa and Pc of the heat radiation lights also increase. On the other hand, as illustrated in FIG. 10D, in second measurement region 42, since the emitted heat radiation light does not change, signal intensity Pb does not change. From signal intensities Pa, Pb, and Pc of the heat radiation lights, it can be estimated that left-side abnormal molten portion 34 has been generated.

Figure 11A:
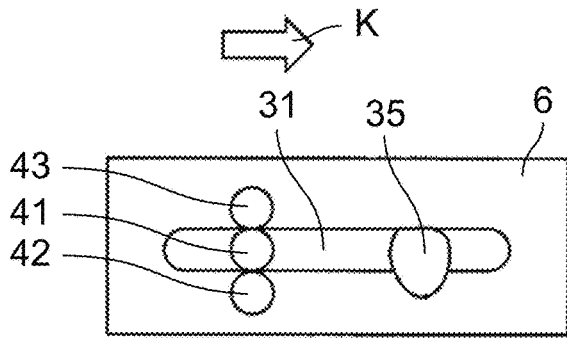
FIG. 11A is a diagram for explaining a signal intensity of a heat radiation light.
Figure 11B:
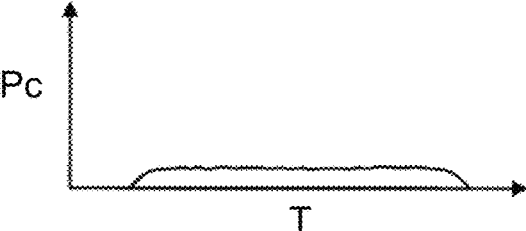
FIG. 11B is a diagram for explaining a signal intensity of a heat radiation light.
Figure 11C:
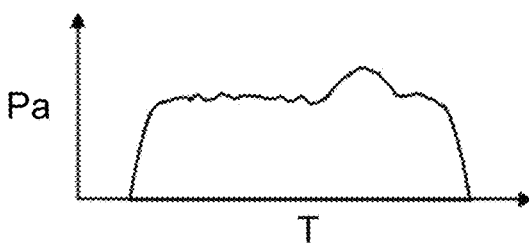
FIG. 11C is a diagram for explaining a signal intensity of a heat radiation light.
Figure 11D:
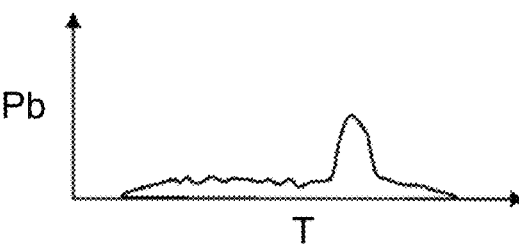
FIG. 11D is a diagram for explaining a signal intensity of a heat radiation light.

FIGS. 11A to 11D illustrate signal intensities Pa, Pb, and Pc of heat radiation lights measured when an abnormal molten portion is generated on the other side of molten portion 31. When right-side abnormal molten portion 35 is generated as illustrated in FIG. 11A, heat radiation lights emitted from measurement regions 41 and 42 are increased as compared with the case of normal molten portion 31. Therefore, as illustrated in FIGS. 11C and 11D, signal intensities Pa and Pb of the heat radiation lights also increase. On the other hand, as illustrated in FIG. 11B, in third measurement region 43, since the emitted heat radiation light does not change, signal intensity Pc does not change. From signal intensities Pa, Pb, and Pc of the heat radiation lights, it can be estimated that right-side abnormal molten portion 35 has been generated.

Specifically, in the present exemplary embodiment, since a peak appears in one of signal intensity Pb and signal intensity Pc, it is possible to determine a direction (right side or left side) in which the melting abnormality has occurred.

Figure 12A:
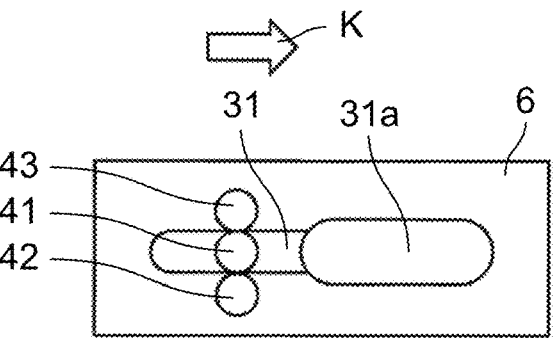
FIG. 12A is a diagram for explaining a signal intensity of a heat radiation light.
Figure 12B:
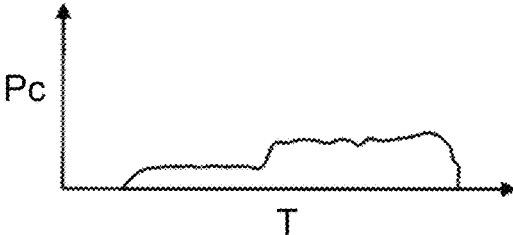
FIG. 12B is a diagram for explaining a signal intensity of heat radiation light.
Figure 12C:
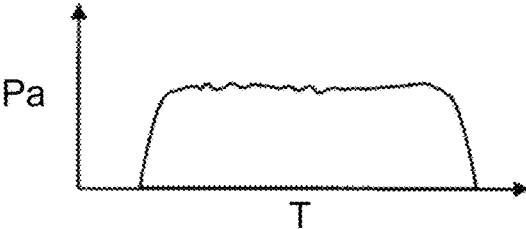
FIG. 12C is a diagram for explaining a signal intensity of a heat radiation light.
Figure 12D:
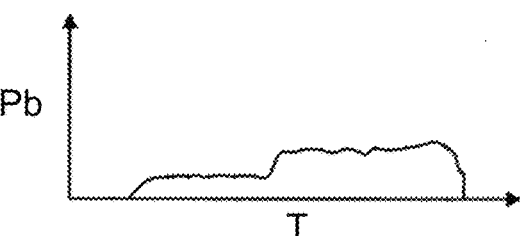
FIG. 12D is a diagram for explaining a signal intensity of a heat radiation light.

FIGS. 12A to 12D illustrate signal intensities Pa, Pb, and Pc of heat radiation lights measured when focal position deviation occurs. As illustrated in FIG. 12A, when the focal position is deviated in a laser irradiation direction in the course of the laser welding, molten portion 31a having a wider melting width than normal molten portion 31 is formed. Therefore, a heat radiation light from molten portion 31a, which is a region of molten portion 31 having a wide melting width, is measured in second measurement region 42 and third measurement region 43. As illustrated in FIGS. 12B and 12D, signal intensities Pb and Pc of the heat radiation lights take larger values after the time when the melting width is widened in the course of the welding. When both signal intensities Pb and Pc of the heat radiation lights take larger values at the same time, it can be estimated that focal position deviation has occurred.

Figure 13A:
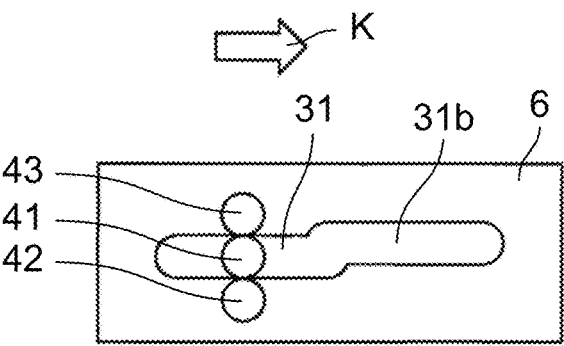
FIG. 13A is a diagram for explaining a signal intensity of a heat radiation light.
Figure 13B:
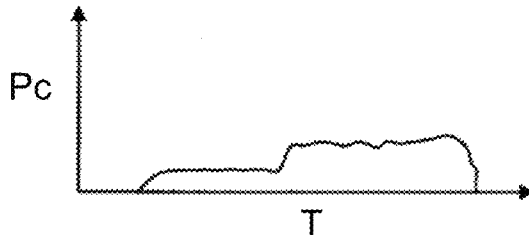
FIG. 13B is a diagram for explaining a signal intensity of a heat radiation light.
Figure 13C:
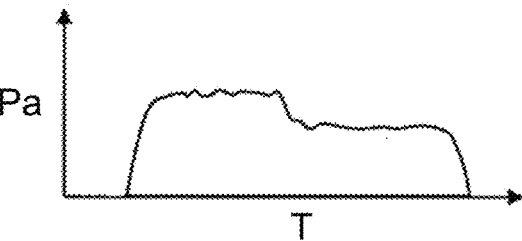
FIG. 13C is a diagram for explaining a signal intensity of a heat radiation light.
Figure 13D:
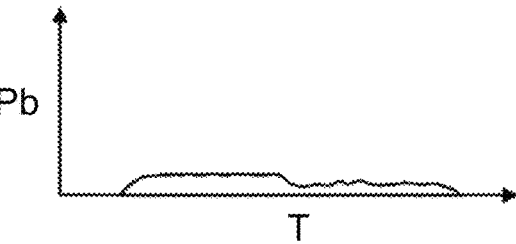
FIG. 13D is a diagram for explaining a signal intensity of a heat radiation light.

FIGS. 13A to 13D illustrate signal intensities Pa, Pb, and Pc of heat radiation lights measured when irradiation position deviation occurs. As illustrated in FIG. 13A, when the irradiation position is deviated in a direction intersecting scanning direction K in the course of the laser welding, molten portion 31b deviated from scanning direction K with respect to normal molten portion 31 is formed. FIG. 13A illustrates molten portion 31b deviated to the left side with respect to scanning direction K. In molten portion 31b, a heat radiation light measured mainly in first measurement region 41 is measured in third measurement region 43. As illustrated in FIGS. 13B to 13D, signal intensity Pc measured in third measurement region 43 takes a larger value, and signal intensities Pa and Pb measured in first measurement region 41 and second measurement region 42 take smaller values. When one of signal intensities Pb and Pc of the heat radiation lights takes a larger value at a certain time and the remaining two signal intensities take smaller values at the same time, it can be estimated that the irradiation position deviation to one side has occurred.

Next, a method for evaluating a laser welding state in the exemplary embodiment will be described. Evaluation of a welding state is performed by comparing the intensities of welding lights W1, W2, and W3 with a preset reference value. In the present exemplary embodiment, an upper limit signal intensity and a lower limit signal intensity will be described as an example of the reference value.

First, normal signal intensity $P0(t)$ of a heat radiation light during normal welding is measured at time t, and an upper limit signal intensity and a lower limit signal intensity are calculated based on normal signal intensity $P0(t)$. Time t is a time from before start of laser irradiation to after completion of the laser irradiation. Normal signal intensity $P0(t)$ is measured a plurality of times, usually, 30 times or more. Normal signal intensity $P0(t)$ changes at time t according to the waveform of output P1 of laser beam L1 to be emitted, and has such a trapezoidal waveform as illustrated in FIG. 4. Normal signal intensity $P0(t)$ includes normal signal intensities $P0a(t)$, $P0b(t)$, and $P0c(t)$ of respective heat radiation lights emitted from measurement regions 41, 42, and 43 during normal welding. From normal signal intensities $P0(t)$ measured a plurality of times, average signal intensity $Pm(t)$ and standard deviation $P\sigma(t)$ indicating the degree of variation of normal signal intensity $P0(t)$ are calculated. Upper limit signal intensity $Pu(t)$ and lower limit signal intensity $Pd(t)$ are calculated by Equations (2) and (3) using average signal intensity $Pm(t)$, standard deviation $P\sigma(t)$, and sigma level coefficient k.

$$Pu(t)=Pm(t)+k{\cdot}P\sigma(t) \qquad (2)$$

$$Pd(t)=Pm(t)-k{\cdot}P\sigma(t) \qquad (3)$$

Since normal signal intensity $P0(t)$ changes at time t, upper limit signal intensity $Pu(t)$ and lower limit signal intensity $Pd(t)$ calculated using normal signal intensity $P0(t)$ also change at time t. For example, when k=3, a probability that signal intensity $P(t)$ is included between upper limit signal intensity $Pu(t)=Pm(t)+3P\sigma(t)$ and lower limit signal intensity $Pd(t)=Pm(t)-3P\sigma(t)$ is statistically 99.73%. In a case of K=4, a probability that signal intensity P is included between upper limit signal intensity $Pu(t)=Pm(t)+4P\sigma(t)$ and lower limit signal intensity $Pd(t)=Pm(t)-4P\sigma(t)$ is statistically 99.94%. Calculated upper limit signal intensity $Pu(t)$ and lower limit signal intensity $Pd(t)$ are stored in storage unit 16 as reference values for the intensities of welding lights W1, W2, and W3.

Figure 14A:
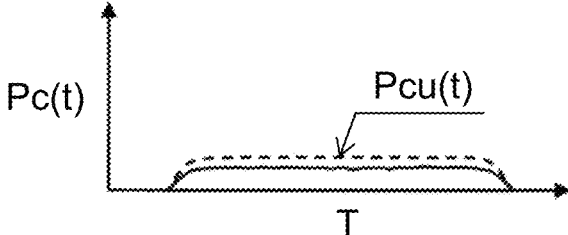
FIG. 14A is a diagram for explaining an upper limit signal intensity and a lower limit signal intensity.
Figure 14B:
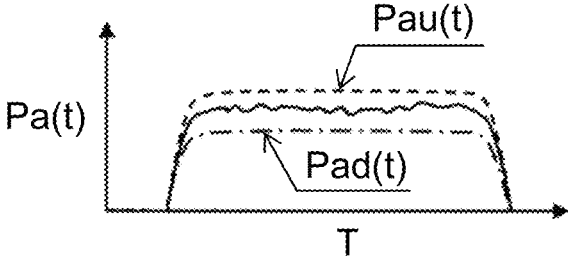
FIG. 14B is a diagram for explaining an upper limit signal intensity and a lower limit signal intensity.
Figure 14C:
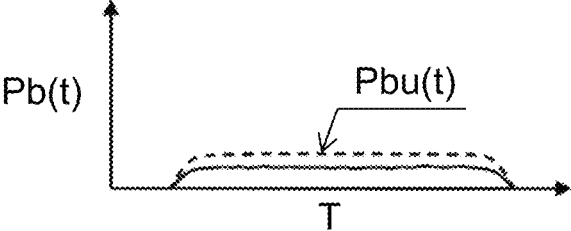
FIG. 14C is a diagram for explaining an upper limit signal intensity and a lower limit signal intensity.

FIGS. 14A to 14C are diagrams for explaining an upper limit signal intensity and a lower limit signal intensity.

As illustrated in FIGS. 14A to 14C, upper limit signal intensities $Pau(t)$, $Pbu(t)$, and $Pcu(t)$ are calculated with respect to signal intensities $Pa(t)$, $Pb(t)$, and $Pc(t)$ measured in respective measurement regions 41, 42, and 43. Lower limit signal intensity $Pad(t)$ is calculated with respect to signal intensity $Pa(t)$ measured in first measurement region 41. Upper limit signal intensities $Pau(t)$, $Pbu(t)$, and $Pcu(t)$, and lower limit signal intensity $Pad(t)$ have trapezoidal waveforms according to the waveform of output P1 of laser beam L1 emitted at time t. A welding state is evaluated in each of measurement regions 41, 42, and 43 using upper limit signal intensities $Pau(t)$, $Pbu(t)$, and $Pcu(t)$ and lower limit signal intensity $Pad(t)$. More specifically, when measured signal intensity $Pa(t)$ exceeds upper limit signal intensity $Pau(t)$ or falls below lower limit signal intensity $Pad(t)$ at a certain time t, it is determined that abnormality of the welding state has occurred. When measured signal intensities $Pb(t)$ and $Pc(t)$ exceed upper limit signal intensities $Pbu(t)$ and $Pcu(t)$, respectively, at a certain time t, it is determined that abnormality of the welding state has occurred. On the other hand, signal intensity $Pa(t)$ is lower than or equal to upper limit signal intensity $Pau(t)$ and higher than or equal to lower limit signal intensity $Pad(t)$, and signal intensities $Pb(t)$ and $Pc(t)$ are lower than or equal to upper limit signal intensities $Pbu(t)$ and $Pcu(t)$, it is determined that no abnormality of the welding state has occurred.

Subsequently, a method for evaluating the welding state will be described in more detail with reference to FIG. 15. In the following description and FIG. 15, for the sake of simplicity, signal intensities $Pa(t)$, $Pb(t)$, and $Pc(t)$ of measurement regions 41, 42, and 43 are represented as Pa, Pb, and Pc, respectively. The same applies to other various signal intensities.

Figure 15:
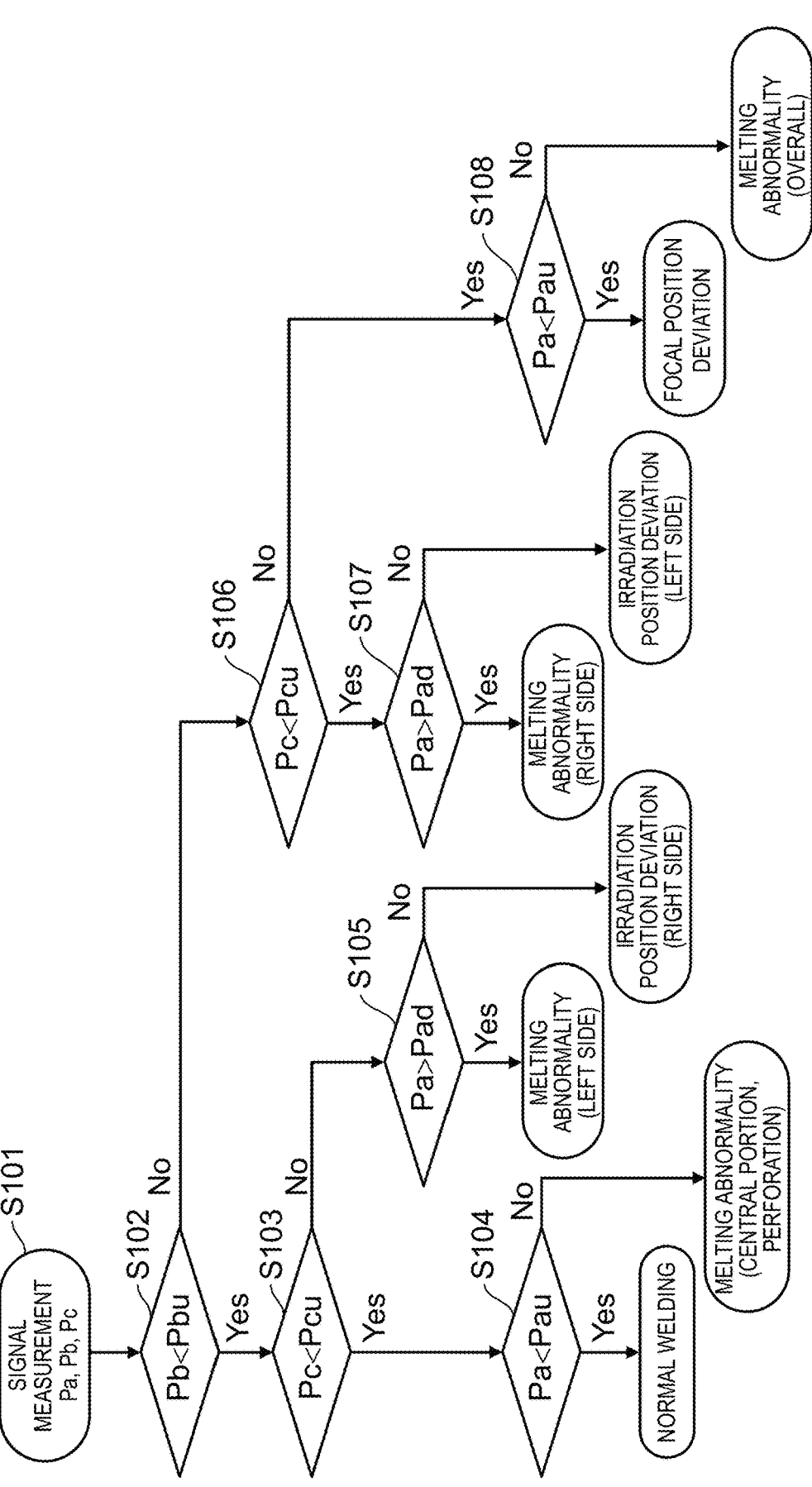
FIG. 15 is a flowchart of welding state evaluation.

FIG. 15 is a flowchart of welding state evaluation.

First, in measurement regions 41, 42, and 43, measurement unit 14 measures signal intensities Pa, Pb, and Pc of heat radiation lights at the time of laser welding (step S101). As described above, first measurement region 41 is located in molten portion 31, second measurement region 42 is located on the right side, and third measurement region 43 is located on the left side.

Next, determination unit 15A determines whether or not signal intensity Pb emitted from second measurement region 42 is lower than upper limit signal intensity Pbu stored in storage unit 16 (step S102).

Next, when signal intensity Pb is lower than upper limit signal intensity Pbu (Yes in S102), determination unit 15A determines whether or not signal intensity Pc emitted from third measurement region 43 is lower than upper limit signal intensity Pcu stored in storage unit 16 (step S103).

Next, when signal intensity Pc is lower than upper limit signal intensity Pcu (Yes in S103), determination unit 15A determines whether or not signal intensity Pa emitted from first measurement region 41 is lower than upper limit signal intensity Pau stored in storage unit 16 (step S104).

Therefore, when signal intensity Pa is lower than upper limit signal intensity Pau (Yes in S104), determination unit 15A determines that the welding is normal welding. When signal intensity Pa is higher than upper limit signal intensity Pau (No in S104), it is determined that melting abnormality (perforation etc.) has occurred in the central portion of molten portion 31.

In step S103, when signal intensity Pc is higher than upper limit signal intensity Pcu (No in S103), determination unit 15A determines whether or not signal intensity Pa is higher than lower limit signal intensity Pad stored in storage unit 16 (step S105).

Therefore, when signal intensity Pa is lower than lower limit signal intensity Pad (No in S105), determination unit 15A determines that irradiation position deviation has occurred on the right side. When signal intensity Pa is higher than lower limit signal intensity Pad (Yes in S105), determination unit 15A determines that melting abnormality has occurred on the left side.

In step S102, when signal intensity Pb is higher than upper limit signal intensity Pbu (No in S102), determination unit 15A determines whether or not signal intensity Pc is lower than upper limit signal intensity Pcu (step S106).

Next, when signal intensity Pc is lower than upper limit signal intensity Pcu (Yes in S106), determination unit 15A determines whether or not signal intensity Pa is higher than lower limit signal intensity Pad stored in storage unit 16 (step S107).

Therefore, when signal intensity Pa is lower than lower limit signal intensity Pad (No in S107), determination unit 15A determines that irradiation position deviation to the left side has occurred. When signal intensity Pa is higher than lower limit signal intensity Pad (Yes in S107), determination unit 15A determines that melting abnormality has occurred on the right side.

In step S106, when signal intensity Pc is higher than upper limit signal intensity Pcu (No in S106), determination unit 15A determines whether or not signal intensity Pa is lower than upper limit signal intensity Pau (step S108).

Then, when signal intensity Pa is lower than upper limit signal intensity Pau (Yes in S108), determination unit 15A determines that focal position deviation has occurred. When signal intensity Pa is higher than upper limit signal intensity Pau (No in S108), determination unit 15A determines that two or more types of melting abnormality among the center melting abnormality, the right-side melting abnormality, and the left-side melting abnormality have occurred.

As described above, the laser welding state can be evaluated by executing steps S101 to S108 using signal intensities Pa, Pb, and Pc of the heat radiation lights.

[Effects]

According to the laser processing method and laser processing device 100 according to the exemplary embodiment, the following effects can be obtained.

The laser processing method according to the present exemplary embodiment is a laser processing method for scanning over member 6 in the first direction while irradiating member 6 with laser beam L1 emitted from laser oscillator 1 (oscillator), and joining member 6 and member 7 adjacent to member 6. The laser processing method includes measuring step S101 and evaluating steps S102 to S108. In measuring step S101, the intensities of welding lights W1 and W2 radiated from at least one of member 6 and member 7 by irradiation with laser beam L1 are measured in each of first measurement region 41 and second measurement region 42 different from first measurement region 41. Welding lights W1 and W2 include any of emitted heat radiation light, plasma light, and reflected light. In evaluating steps S102 to S108, a processing state is evaluated based on the intensities of respective welding lights W1 and W2 measured in first measurement region 41 and second measurement region 42. First measurement region 41 and second measurement region 42 are aligned in the second direction intersecting the first direction (scanning direction K).

Providing two measurement regions 41 and 42 by such method enables intensities of welding lights W1 and W2 measured in the respective regions to be individually evaluated. Therefore, evaluation accuracy of a welding state during laser processing can be improved. Further, by accurately evaluating abnormality in a welding state, outflow of an abnormal welding product to steps after the laser welding can be prevented.

In the laser processing method according to the present exemplary embodiment, in measuring step S101, welding light W1 from first measurement region 41 is condensed on first optical fiber 13La using measurement optical system 10 (optical system). Welding light W1 transmitted by first optical fiber 13a is measured by measurement unit 14a (first sensor). In addition, welding light W2 from second measurement region 42 is condensed on second optical fiber 13b using measurement optical system 10, and the welding light transmitted by second optical fiber 13b is measured by measurement unit 14b (second sensor).

By such a method, welding lights W1 and W2 respectively measured in measurement regions 41 and 42 are individually transmitted to measurement units 14a and 14b to enable evaluation of the intensities of welding lights W1 and W2. Therefore, evaluation accuracy of a welding state during laser processing can be further improved. By condensing welding light W1 from first measurement region 41 and welding light W2 from second measurement region 42 on optical fibers 13a and 13b using same measurement optical system 10, the number of optical systems for carrying out the laser processing method can be reduced. As a result, designing of the optical system for carrying out the laser processing method becomes easy, and costs therefor can be suppressed.

In the laser processing method according to the present exemplary embodiment, first measurement region 41 and second measurement region 42 are aligned in a direction orthogonal to the first direction (scanning direction K).

By such a method, it is possible to arrange measurement regions 41 and 42 enabling more accurate measurement of a welding light generated in the region on the side of irradiation position 30. In addition, it is possible to more easily design measurement optical system 10 that transmits welding lights W1 and W2 to measurement units 14a and 14b and control unit 15.

In the laser processing method according to the present exemplary embodiment, molten portion 31 during normal welding has width D1 in the direction orthogonal to the first direction (scanning direction K). Each of first measurement region 41 and second measurement region 42 has a diameter less than or equal to width D1 of molten portion 31. First measurement region 41 includes irradiation position 30 of laser beam L1 during normal welding.

By such a method, welding light W1 generated in molten portion 31 and welding light W2 generated in other portion can be individually measured. Therefore, evaluation accuracy of the welding state during laser processing can be further improved.

In the laser processing method according to the present exemplary embodiment, first measurement region 41 and second measurement region 42 have the same diameter as width D1 of molten portion 31.

By such a method, welding light W1 generated in molten portion 31 and welding light W2 generated in other portions can be individually measured, and more welding light W1 can be measured in molten portion 31. Therefore, evaluation accuracy of the welding state during laser processing can be further improved.

In measuring step S101 of the laser processing method according to the present exemplary embodiment, the intensity of welding light W3 is measured in third measurement region 43 different from first measurement region 41 and second measurement region 42. First measurement region 41, second measurement region 42, and third measurement region 43 are aligned adjacent to each other in the direction orthogonal to the first direction (scanning direction K). First measurement region 41 includes irradiation position 30 of laser beam L1 during normal welding. Second measurement region 42 and third measurement region 43 are arranged with first measurement region 41 interposed therebetween.

By such a method, welding lights W1, W2, and W3 can be measured in real time at irradiation position 30 where molten portion 31 is formed and in adjacent regions on both sides of the irradiation position. In addition, it is possible to evaluate the overall welding state including melting and solidification phenomena and the like in the surroundings excluding irradiation position 30. Therefore, evaluation accuracy of the welding state during laser processing can be further improved. Furthermore, irradiation position deviation and focal position deviation can also be evaluated.

In the laser processing method according to the present exemplary embodiment, signal intensity Pa of welding light W1 measured in first measurement region 41 is compared with preset upper limit signal intensity Pau or lower limit signal intensity Pad (first threshold value) (S104, S105, S107, S108). Further, signal intensity Pb of welding light W2 measured in second measurement region 42 is compared with preset upper limit signal intensity Pbu (second threshold value) (S102). Further, signal intensity Pc of welding light W3 measured in third measurement region 43 is compared with preset upper limit signal intensity Pcu (third threshold value) (S103).

By such a method, whether the welding state is normal or not can be evaluated. Further, when the welding state is not normal, it is possible to specify which of welding abnormality, irradiation position deviation, and focal position deviation causes abnormality.

In the laser processing method according to the present exemplary embodiment, signal intensities Pa, Pb, and Pc are measured in measurement regions 41, 42, and 43. When signal intensity Pa is lower than lower limit signal intensity Pad, signal intensity Pb is lower than upper limit signal intensity Pbu, and signal intensity Pc is higher than upper limit signal intensity Pcu, it is determined that melting abnormality has occurred on one side of molten portion 31.

According to such a method, it is possible to specify a place where melting abnormality has occurred, and it is possible to further improve evaluation accuracy of a welding state during laser processing.

In the laser processing method according to the present exemplary embodiment, signal intensities Pa, Pb, and Pc are measured in measurement regions 41, 42, and 43. When signal intensity Pa is lower than lower limit signal intensity Pad, signal intensity Pb is higher than upper limit signal intensity Pbu, and signal intensity Pc is higher than upper limit signal intensity Pcu, it is determined that the focal position of laser beam L1 is deviated along the irradiation direction of laser beam L1.

By such a method, focal position deviation can be determined, and evaluation accuracy of a welding state during laser processing can be further improved.

Laser processing device 100 according to the present exemplary embodiment scans over member 6 in the first direction while irradiating member 6 with laser beam L1, and joins member 6 and member 7 adjacent to the member 6 by molten portion 31. Laser processing device 100 includes laser oscillator 1, irradiation optical system 2, stage 8, measurement optical system 10, measurement unit 14a (first sensor), measurement unit 14b (second sensor), and control unit 15. Laser oscillator 1 emits laser beam L1. Irradiation optical system 2 guides laser beam L1 to member 6. Stage 8 moves members 6 and 7 relative to laser beam L1 to cause laser beam L1 to scan. Measurement optical system 10 guides, respectively from first measurement region 41 and second measurement region 42 different from first measurement region 41, welding lights W1 and W2 emitted from at least one of member 6 and member 7 by irradiation. Measurement unit 14a measures the intensity of welding light W1 guided from first measurement region 41 to measurement optical system 10. Measurement unit 14b measures welding light W2 guided from second measurement region 42 to measurement optical system 10. Control unit 15 evaluates the welding state based on the intensities of welding lights W1 and W2 measured respectively in first measurement region 41 and second measurement region 42. First measurement region 41 and second measurement region 42 are aligned in the second direction intersecting the first direction (scanning direction K).

With such a configuration, it is possible to individually evaluate welding lights W1 and W2 measured in two measurement regions 41 and 42, respectively. Therefore, evaluation accuracy of a welding state during laser processing can be improved.

Laser processing device 100 according to the present exemplary embodiment further includes first optical fiber 13a and second optical fiber 13b. First optical fiber 13a transmits, to measurement unit 14a, welding light W1 guided from first measurement region 41 to measurement optical system 10. Second optical fiber 13b transmits, to measurement unit 14b, welding light W2 guided from second measurement region 42 to measurement optical system 10.

Such a configuration enables welding lights W1 and W2 respectively measured in measurement regions 41 and 42 to be individually transmitted to measurement units 14a and 14b to evaluate the intensities of welding lights W1 and W2. Therefore, evaluation accuracy of a processing state during laser processing can be further improved.

The present disclosure is not limited to the above-described exemplary embodiment, and can be implemented in various other modes.

While in the present exemplary embodiment, the superposition laser welding has been described as an example, the present disclosure is not limited thereto. The present disclosure can be applied also to evaluation of a processing state in other types of lasers or other laser processing methods.

Although in the present exemplary embodiment, the example in which three measurement regions 41, 42, and 43 are used has been described, the present disclosure is not limited thereto. Even in a case where a welding light is measured in two or more measurement regions, evaluation accuracy of a welding state can be improved.

Although the present exemplary embodiment has been described with respect to the example in which three measurement regions 41, 42, and 43 are aligned in the straight line orthogonal to scanning direction K, the present disclosure is not limited thereto. Measurement regions 41, 42, and 43 may be arranged in a straight line having an angle with respect to the straight line orthogonal to scanning direction K. In addition, measurement regions 41, 42, and 43 may be arranged in a curved shape. Any arrangement of measurement regions 41, 42, and 43 is applicable as long as a welding light can be measured. For example, one measurement region may be provided at irradiation position 30, and the other measurement regions may be arranged in a circular shape around the one measurement region.

Although the present exemplary embodiment has been described with respect to the example in which measurement regions 41, 42, and 43 are circular regions having the same diameter as melting width D1, the present disclosure is not limited thereto. Measurement regions 41, 42, and 43 need only be shaped and dimensioned to include a region where a welding light is radiated. For example, the shapes of measurement regions 41, 42, and 43 may be changed according to a shape of irradiation position 30 of laser beam L1 or a temperature distribution of molten portion 31.

Although the present exemplary embodiment has been described with respect to the example in which a welding light generated due to heat radiation is measured, the present disclosure is not limited thereto. Even when another welding light such as a plasma light or a laser reflected light is measured, a welding state can be evaluated. In particular, since a laser reflected light is affected by a shape of a molten portion, the shape of the molten portion can be evaluated in more detail by evaluating a signal intensity of the laser reflected light.

Although the present disclosure has been fully described in connection with the preferable exemplary embodiment with reference to the accompanying drawings, various modifications and changes are obvious to those skilled in the art. It is to be understood that such modifications and changes are included in the scope of the claims of the present disclosure unless such modifications and changes depart from the scope of the present invention according to the scope of the appended claims.

The laser processing method to which the present disclosure can be applied is applicable not only to evaluation of a melting state of a laser irradiation position but also to evaluation of an overall processing state including a molten portion or a solidified portion in the surroundings excluding the laser irradiation portion.

What is claimed is:

1. A laser processing method for scanning over a first member in a first direction while irradiating the first member with a laser beam emitted from an oscillator, and joining the first member and a second member adjacent to the first member by a molten portion, the laser processing method comprising:

measuring, in each of a first measurement region, a second measurement region different from the first measurement region, and a third measurement region different from the first measurement region and the second measurement region, an intensity of a welding light radiated from at least one of the first member or the second member by irradiation with the laser beam, the welding light including at least one of a heat radiation light, a plasma light, or a reflected light; and evaluating a state of a laser processing based on the intensity of the welding light measured in each of the first measurement region, the second measurement region, and the third measurement region, wherein:

the first measurement region, the second measurement region, and the third measurement region are aligned adjacent to each other in a second direction intersecting the first direction;

the first measurement region is located in the molten portion, and sandwiched between the second measurement region and the third measurement region; and the evaluating the state of the laser processing includes determining, based on a relative relationship between the intensities measured in adjacent measurement regions of the first, second, and third measurement regions, that a melting abnormality has occurred on one side of the molten portion in the second direction.

2. The laser processing method according to claim 1, wherein the measuring the intensity of the welding light includes:

condensing the welding light from the first measurement region on a first optical fiber using an optical system to measure, by a first sensor, the welding light transmitted by the first optical fiber; and condensing the welding light from the second measurement region on a second optical fiber using the optical system to measure, by a second sensor, the welding light transmitted by the second optical fiber.

3. The laser processing method according to claim 1, wherein the second direction is orthogonal to the first direction.

4. The laser processing method according to claim 1, wherein:

during normal welding, the molten portion has a width in a direction orthogonal to the first direction;

each of the first measurement region and the second measurement region has a diameter less than or equal to the width of the molten portion; and the first measurement region includes an irradiation position of the laser beam during normal welding.

5. The laser processing method according to claim 4, wherein the diameter of each of the first measurement region and the second measurement region is equal to the width of the molten portion.

6. The laser processing method according to claim 1, wherein the evaluating the state of the laser processing includes:

comparing a first signal intensity of the welding light measured in the first measurement region with a first threshold value;

comparing a second signal intensity of the welding light measured in the second measurement region with a second threshold value; and comparing a third signal intensity of the welding light measured in the third measurement region with a third threshold value.

7. The laser processing method according to claim 6, wherein:

the first threshold value is a lower limit value, the second threshold value is an upper limit value, and the third threshold value is an upper limit value; and the evaluating the state of the laser processing includes determining that the melting abnormality has occurred on the one side of the molten portion in the second direction when the first signal intensity is smaller than the first threshold value, the second signal intensity is smaller than the second threshold value, and the third signal intensity is larger than the third threshold value.

8. The laser processing method according to claim 6, wherein:

the first threshold value is an upper limit value, the second threshold value is an upper limit value, and the third threshold value is an upper limit value; and the evaluating the state of the laser processing includes determining that a focal position of the laser beam is deviated along an irradiation direction of the laser beam when the first signal intensity is smaller than the first threshold value, the second signal intensity is larger than the second threshold value, and the third signal intensity is larger than the third threshold value.

9. A laser processing device for scanning over a first member in a first direction while irradiating the first member with a laser beam, and joining the first member and a second member adjacent to the first member by a molten portion, the laser processing device comprising:

an oscillator configured to emit the laser beam;

an irradiation optical system configured to guide the laser beam to the first member;

a stage configured to move the first member and the second member relative to the laser beam to cause the laser beam to scan in the first direction;

a measurement optical system configured to guide, from each of a first measurement region, a second measurement region different from the first measurement region, and a third measurement region different from the first measurement region and the second measurement region, a welding light radiated from at least one of the first member or the second member by irradiation with the laser beam, the welding light including at least one of a heat radiation light, a plasma light, or a reflected light;

a first sensor configured to measure a first intensity of the welding light guided from the first measurement region to the measurement optical system;

a second sensor configured to measure a second intensity of the welding light guided from the second measurement region to the measurement optical system;

a third sensor configured to measure a third intensity of the welding light guided from the third measurement region to the measurement optical system; and a determination unit configured to evaluate a state of a laser processing based on the first intensity, the second intensity, and the third intensity, wherein:

the first measurement region, the second measurement region, and the third measurement region are aligned adjacent to each other in a second direction intersecting the first direction;

the first measurement region is located in the molten portion and sandwiched between the second measurement region and the third measurement region; and the determination unit is further configured to determine that a melting abnormality has occurred on one side of the molten portion in the second direction based on a relative relationship between the intensities measured in adjacent measurement regions of the first, second, and third measurement regions.

10. The laser processing device according to claim 9, further comprising:

a first optical fiber configured to transmit, to the first sensor, the welding light guided from the first measurement region to the measurement optical system;

a second optical fiber configured to transmit, to the second sensor, the welding light guided from the second measurement region to the measurement optical system; and a third optical fiber configured to transmit, to the third sensor, the welding light guided from the third measurement region to the measurement optical system.

* * * * *